United States Patent
Sams et al.

(10) Patent No.: US 12,458,905 B2
(45) Date of Patent: Nov. 4, 2025

(54) LITHIUM RECOVERY USING AQUEOUS SOURCES

(71) Applicant: Schlumberger Technology Corporation, Sugar Land, TX (US)

(72) Inventors: Gary W. Sams, Houston, TX (US); Dominic Vincent Perroni, Sugar Land, TX (US); Prasanna Nirgudkar, Sugar Land, TX (US); Florence Binet, Houston, TX (US); Rod William Shampine, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 18/311,975

(22) Filed: May 4, 2023

(65) Prior Publication Data
US 2023/0356107 A1   Nov. 9, 2023

Related U.S. Application Data

(60) Provisional application No. 63/374,441, filed on Sep. 2, 2022, provisional application No. 63/364,142, filed on May 4, 2022.

(51) Int. Cl.
*B01D 11/04* (2006.01)
*B01D 15/20* (2006.01)
(Continued)

(52) U.S. Cl.
CPC ........ *B01D 11/0415* (2013.01); *B01D 15/203* (2013.01); *B01D 15/361* (2013.01);
(Continued)

(58) Field of Classification Search
CPC ............... B01D 11/0415; B01D 15/203; B01D 15/361; B01D 61/026; B01D 61/04;
(Continued)

(56) References Cited

U.S. PATENT DOCUMENTS

| | | |
|---|---|---|
| 3,084,028 A | 4/1963 | Foulletier |
| 3,306,700 A | 2/1967 | Neipert et al. |

(Continued)

FOREIGN PATENT DOCUMENTS

| | | |
|---|---|---|
| CN | 1511964 A | 7/2004 |
| CN | 104313348 A | 1/2015 |

(Continued)

OTHER PUBLICATIONS

Xu, W. et al., "A Comprehensive Membrane Process for Preparing Lithium Carbonate from High Mg/Li Brine", Membranes, Oct. 2020, 14 pages.
(Continued)

*Primary Examiner* — Sally A Merkling
*Assistant Examiner* — Sean P. O'Keefe
(74) *Attorney, Agent, or Firm* — Jeffrey D. Frantz

(57) ABSTRACT

Described herein are methods of recovering lithium from dilute lithium sources. The methods include extracting lithium from an extraction feed using direct lithium extraction in an extraction stage to yield a lithium intermediate, performing one or more concentration operations, each concentration operation concentrating an input stream to yield an output feed, wherein the input stream is obtained from the lithium intermediate and/or the extraction feed is obtained from the output feed. At least one of the concentration operations includes a membrane separation operation having a plurality of reactors in series each having a semi-permeable membrane, such as a counter-flow reverse osmosis operation. Methods may also include generating a low
(Continued)

TDS stream as a permeate from any of the one or more concentration operations, wherein the low TDS stream is recycled or used as fresh water.

20 Claims, 7 Drawing Sheets

(51) Int. Cl.
| | |
|---|---|
| B01D 15/36 | (2006.01) |
| B01D 61/02 | (2006.01) |
| B01D 61/04 | (2006.01) |
| B01D 61/44 | (2006.01) |
| B01D 61/58 | (2006.01) |
| C22B 3/22 | (2006.01) |
| C22B 3/24 | (2006.01) |
| C22B 26/12 | (2006.01) |
| C22C 24/00 | (2006.01) |
| C25C 1/02 | (2006.01) |

(52) U.S. Cl.
CPC .......... *B01D 61/026* (2022.08); *B01D 61/04* (2013.01); *B01D 61/44* (2013.01); *B01D 61/58* (2013.01); *C22B 3/22* (2013.01); *C22B 3/24* (2013.01); *C22B 26/12* (2013.01); *C22C 24/00* (2013.01); *C25C 1/02* (2013.01); *B01D 2311/04* (2013.01); *B01D 2315/24* (2022.08); *B01D 2317/022* (2013.01); *B01D 2317/025* (2013.01)

(58) Field of Classification Search
CPC .... B01D 61/44; B01D 61/58; B01D 2311/04; B01D 2315/24; B01D 2317/022; B01D 2317/025; B01D 61/025; B01D 15/1807; C22B 3/22; C22B 26/12; C22B 3/24; C22C 24/00; C25C 1/02

See application file for complete search history.

(56) References Cited

U.S. PATENT DOCUMENTS

| | | | |
|---|---|---|---|
| 4,127,989 | A | 12/1978 | Mickelson |
| 4,291,001 | A | 9/1981 | Repsher et al. |
| 9,068,247 | B2 | 6/2015 | Marston et al. |
| 10,604,414 | B2 | 3/2020 | Featherstone |
| 11,298,658 | B2 | 4/2022 | Wohlert |
| 11,365,128 | B2 | 6/2022 | Marston et al. |
| 12,280,322 | B2 * | 4/2025 | Sams ................ B01D 61/025 |
| 2011/0174739 | A1 | 7/2011 | Chung et al. |
| 2014/0374104 | A1 | 12/2014 | Seth |
| 2018/0147532 | A1 | 5/2018 | Switzer |
| 2018/0207584 | A1 | 7/2018 | Chang |
| 2018/0245180 | A1 | 8/2018 | Cheng et al. |
| 2019/0248667 | A1 | 8/2019 | Featherstone et al. |
| 2019/0256368 | A1 | 8/2019 | Marston et al. |
| 2020/0047124 | A1 | 2/2020 | Bhave |
| 2020/0086271 | A1 | 3/2020 | Harrison |
| 2020/0189924 | A1 | 6/2020 | Featherstone et al. |
| 2020/0283921 | A1 | 9/2020 | Mislan |
| 2020/0299805 | A1 | 9/2020 | Mceachern |
| 2020/0399772 | A1 | 12/2020 | Kiggins |
| 2021/0079497 | A1 | 3/2021 | Baxter |
| 2021/0087697 | A1 | 3/2021 | Riabtsev et al. |
| 2021/0346822 | A1 | 11/2021 | Ireland |
| 2022/0055910 | A1 | 2/2022 | Jariwala et al. |
| 2022/0395780 | A1 | 12/2022 | Bhave et al. |
| 2023/0032153 | A1 | 2/2023 | Sams et al. |
| 2023/0086861 | A1 | 3/2023 | Sams et al. |
| 2023/0088458 | A1 | 3/2023 | Sams et al. |
| 2023/0366062 | A1 | 11/2023 | Sams et al. |

FOREIGN PATENT DOCUMENTS

| | | |
|---|---|---|
| JP | 2011032151 A | 2/2011 |
| JP | 2018172775 A | 11/2018 |
| JP | 7084669 B1 | 6/2022 |
| RU | 2688593 C1 | 5/2019 |
| WO | 2018190754 A2 | 10/2018 |
| WO | 2019160982 A1 | 8/2019 |
| WO | 2019221932 A1 | 11/2019 |
| WO | 2020128619 A1 | 6/2020 |
| WO | 2021061343 A1 | 4/2021 |
| WO | 2021160240 A1 | 8/2021 |
| WO | 2021212214 A1 | 10/2021 |
| WO | 2021228936 A1 | 11/2021 |
| WO | 2021231894 A1 | 11/2021 |
| WO | 2022040630 A1 | 2/2022 |
| WO | 2022203706 A1 | 9/2022 |
| WO | 2023009887 A1 | 2/2023 |
| WO | 2023009888 A1 | 2/2023 |
| WO | 2023022627 A1 | 2/2023 |

OTHER PUBLICATIONS

Kumar, A. et al., "Metals Recovery from Seawater Desalination Brines: Technologies, Opportunities and Challenges", ACS Sustainable Chemistry & Engineering Sep. 2021, 7704-7712.

Zhao, X. et al., "Review on the electrochemical extraction of lithium from seawater/brine", Journal of Electroanalytical Chemistry 2019, 850, 113389, 13 pages.

Yang, S. et al., "Lithium Mteal Extraction from Seawater", Joule, Feb. 2018, pp. 1648-1651.

Liu, C. et al., "Lithium Extraction from Seawater through Pulsed Electrochemical Intercalation", Joule Apr. 2020, pp. 1459-1469.

Li, Z. et al., "Continuous electrical pumping membrane process for seawater lithium mining", Energy & Environmental Science 2021, 14, pp. 3152-3159.

International Search Report and Written Opinion issued in the PCT Application No. PCT/US2021/047156 dated Nov. 25, 2021, 11 pages.

International Preliminary Report on Patentability of International Patent Application No. PCT/US2021/047156 dated Mar. 2, 2023, 8 pages.

International Search Report and Written Opinion issued in the PCT Application No. PCT/US2023/020954 dated Jul. 10, 2023, 12 pages.

International Search Report and Written Opinion issued in the PCT Application No. PCT/US2023/020957 dated Jul. 10, 2023, 12 pages.

International Search Report and Written Opinion issued in the PCT Application No. PCT/US2022/051500 dated May 2, 2023, 12 pages.

Watercycle Technologies, "Technology", 2022, accessed Sep. 19, 2024, https://www.watercycletechnologies.com/technology, 6 pages.

KMX Technologies, "Technogy", 2024, accessed Sep. 19, 2024, https://kmxtechnologies.com/kmx-technology/, 9 pages.

Tabelin, C. B. et al., Towards a low-carbon society: A review of lithium resource availability, challenges and recycling, and future perspectives, Minerals Engineering, 2021, 163(9), 23 pages.

Warren, I., Techno-Economic Analysis of Lithium Extraction from Geothermal Brines, downloaded on Sep. 2, 2024 from [https://www.nrel.gov/docs/fy21osti/79178.pdf], 2021, 48 pages.

* cited by examiner

LITHIUM RECOVERY USING AQUEOUS SOURCES

CROSS-REFERENCE TO RELATED APPLICATIONS

This patent application claims benefit of U.S. Provisional Patent Application Ser. No. 63/364,142 filed May 4, 2022, which is entirely incorporated herein by reference, and from Application Ser. No. 63/374,441 filed Sep. 2, 2022, which is entirely incorporated herein by reference, and from International Application No. PCT/US2022/051500, filed Dec. 1, 2022, which is entirely incorporated herein by reference.

FIELD

This patent application describes methods and apparatus for lithium recovery from aqueous sources. Specifically, effective processes for concentrating and recovering lithium from dilute sources are described.

BACKGROUND

Lithium is a key element in energy storage. Electrical storage devices, such as batteries, supercapacitors, and other devices commonly use lithium to mediate the storage and release of chemical potential energy as electrical current. As demand for renewable, but non-transportable, energy sources such as solar and wind energy grows, demand for technologies to store energy generated using such sources also grows.

According to the United States Geological Survey, global reserves of lithium total 22 million tons (metric) of lithium content, with Chile, Australia, Argentina, and China accounting for about 85% of global reserves. U.S. Geological Survey, Mineral Commodity Summaries, January 2022. According to S&P Global Market Intelligence, lithium supply is forecast to be 636 kT LCE in 2022, up from 497 kT in 2021. Global consumption was estimated at 64 kT in 2021, putting current lithium supplies in deficit. Global consumption and is expected to reach 2 MTa by 2030 for an average annual growth in demand of approximately 13.5%. Supply is currently forecast to run behind demand, and lithium prices currently outstrip even the most optimistic forecasts. While lithium prices are quite volatile as the global market develops, lithium prices are expected to remain high through 2030. The incentive for more lithium production could not be clearer.

Lithium extraction from brine has become a favored method of lithium recovery. Heretofore, most development has been focused on brine sources with relatively high concentrations of lithium, but other more dilute sources are also plentiful. Effective and efficient processes for recovering lithium from dilute sources are needed.

SUMMARY

The disclosure relates to a method of recovering lithium from a lithium source, comprising extracting lithium from an extraction feed using direct lithium extraction in an extraction stage to yield a lithium intermediate; concentrating the lithium intermediate in an impurity preparation stage to yield an impurity stage feed; and treating the impurity stage feed in an impurity stage to remove impurities and to form a purified lithium stream.

The disclosure also relates to a method of recovering lithium from an aqueous lithium source, comprising separating lithium using a lithium selective electrochemical separation process; and concentrating lithium using a concentration process comprising counter-flow reverse osmosis operation.

DETAILED DESCRIPTION

Figure 1:
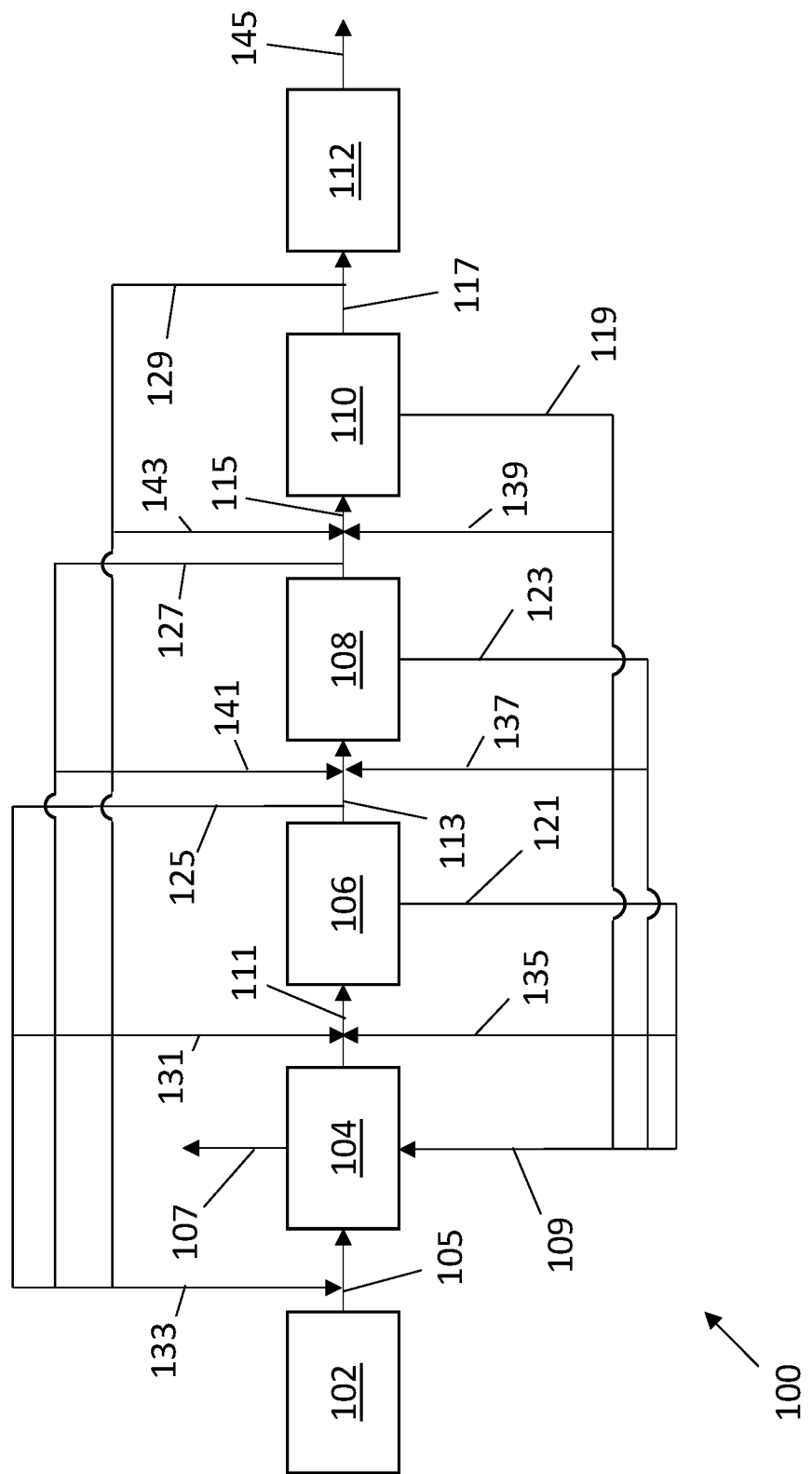
FIG. 1 is a schematic process diagram of a lithium recovery process according to one embodiment.

Direct extraction of lithium is commonly used in lithium recovery from aqueous lithium sources. Some direct extraction processes employ a solid material to withdraw lithium selectively from a lithium source onto or into the withdrawal material. A recovery fluid is then contacted with the loaded withdrawal material to remove the lithium from the withdrawal material to form a lithium intermediate stream. The quantity of recovery fluid generally determines the concentration of lithium in the lithium intermediate stream, but unloading rate of ions from the withdrawal material can provide an effective upper limit to the concentration achievable.

In ion withdrawal, the withdrawal material is generally chosen to be selective to lithium. That may mean that many types of cations are removed from the source, but lithium is removed more readily than other cations. Thus, the ions removed by the withdrawal material include lithium possibly along with other impurities, such as monovalent cations sodium and potassium and divalent cations calcium and magnesium. Longer recovery processing can enhance ion removal in each cycle, but such measures are subject to diminishing returns as throughput declines. Thus, recovery fluid application rate is subject to an optimum which trades lithium intermediate stream concentration, recovery time, and degradation of loading capacity.

An ion withdrawal direct lithium extraction process may be an ion exchange or ion replacement process, where the withdrawal medium is pre-loaded with ions that are exchanged to the feed fluid while withdrawing other ions from the feed fluid. In such cases, the withdrawal and recovery processes are both typically ion exchange or ion replacement processes, but an ion exchange process where the recovery fluid does not replace ions can also be used, where ions are replaced for the withdrawal step by exposing the withdrawal medium to a third fluid for the purpose of preloading exchange ions.

Direct lithium extraction processes can also use a lithium selective electrochemical separation process. The lithium selective electrochemical separation process uses a voltage bias to drive materials through a lithium selective membrane to separate lithium from an aqueous lithium source. The aqueous lithium source is brought into contact with a first side of the lithium selective membrane, and an aqueous eluent material is brought into contact with a second side of the lithium selective membrane, opposite from the first side. The voltage bias is applied within the aqueous lithium source and the aqueous eluent material to form an electric field within both materials and extending across the lithium selective membrane. The electric field provides a driving force to move, or increase movement of, charged species through the lithium selective membrane. The species motivated by the electric field to move through the lithium selective membrane depends on the configuration of the lithium selective membrane. For example, the lithium selective membrane may selectively pass lithium ions more than other ions or the lithium selective membrane may selective block passage of lithium ions more than other ions.

Direct lithium extraction processes that include lithium selective electrochemical separation processes use lithium selective membranes. Such membranes can include, or be made of, lithium selective materials such as lithium aluminum germanium phosphate, lithium aluminum titanium phosphate, lithium lanthanum titanates, or a metal organic framework type material such as UiO-66 with acid and amine groups. Such materials can be configured alone in a membrane structure or can be added to a support material, such as a resin, configured into a membrane structure.

In some cases, the direct lithium extraction process may be an adsorption process where ions are adsorbed from the aqueous lithium stream solution onto the surface of a solid adsorbent material that is selective to lithium, such as metal oxide, metal hydroxide or such material mixed with a resin. A desorbent solution is used to recover the withdrawn ions. In other cases, the direct lithium extraction process may be an absorption process where ions are absorbed from the brine solution into the bulk of a solid absorbent material that is selective to lithium. A desorbent solution is used in these cases, as well. These cases of pure sorption-desorption can require regeneration of the withdrawal medium because unloading of ions from medium is not quantitative.

FIG. 1 is a schematic process diagram of a lithium recovery process 100, according to one embodiment. The process 100 uses an extraction stage 104 that performs direct lithium extraction, as described above. An extraction feed 105 is provided to the extraction stage 104 for withdrawal of ions, or electrochemical separation, to produce a lithium-depleted stream 107. The extraction stage 104 is most effective where lithium concentration in the extraction feed 105 is at least about 70 ppm, for example at least about 100. Lithium sources having higher concentrations, for example as high as 1,000-3,000 ppm, of lithium can also be used.

In sorption/desorption embodiment where the adsorbent material is a solid, the adsorbent material may be stationary or fluidized within the vessel, or conveyed through one or more vessels or zones for contacting with the brine, for example in a counter-current format. In particular, the adsorbent material may be contained in a plurality of vessels in flow communication with one another and the vessels may be fluidly connected with a plurality of zones (ie inlets/outlets) during the extraction process. The extraction 104 may therefore take place continuously, for instance loading resin in a first vessel with lithium by fluidly connecting this vessel with the brine source while unloading resin in a second vessel by fluidly connecting the second vessel with the eluent and washing a third vessel using a strip solution. The extraction may be continuous counter-current adsorption desorption (CCAD). An example of a counter-current adsorption desorption that may be used is for instance described in U.S. Pat. No. 11,365,128 from EnergySource Minerals, which is hereby incorporated by reference as a description of an example process.

The lithium-depleted stream 107 may be separated into a reject stream and a fresh water stream using at least a membrane separation operation having a semi-permeable membrane, or a thermal vaporizer such as vaporizer 200 described below. The reject stream may be returned to the environment (i.e. reinjected into the geological formation) and the fresh water stream may be recycled into another stream of the process 100. When a membrane separation operation is deployed it may be configured to perform electrodialysis, reverse osmosis, counter-flow reverse osmosis, a combination of both reverse osmosis and counter-flow reverse osmosis such as described elsewhere herein. In that case, the lithium-depleted stream takes place of the lithium extract, the reject stream takes place of the lithium concentrate and the fresh water stream corresponds to the permeate stream.

The process 100 is configured to use dilute lithium sources. The sources can be salar brines, water leached from rock and clay formations and/or leaching resins, produced water from wells, mines, and geothermal installations, seawater, pre-treated aqueous lithium sources such as desalinator or electrochemical process effluents, recycled lithium from previous industrial applications, and other sources. Some of these sources can have very low concentrations of lithium (seawater, for example, averages about 0.4 ppm lithium) and very high relative concentrations of impurity ions such as sodium. Most of the impurity ions have solubility in water lower than lithium, so bringing concentration of lithium up in these materials generally precipitates solids, which must be managed.

The process 100 uses a feed preparation stage 102 to prepare a feed for the extraction stage 104. The feed preparation stage 102 generally raises lithium concentration and TDS to an effective range for the extraction stage 104. Any known way of raising concentration in an aqueous fluid may be used during feed preparation stage. For example, membrane processes, such as reverse osmosis ("RO"), nanofiltration ("NF," sometimes also referred to as "loose" RO), and counter-flow reverse osmosis (such as CFRO® that is a counter-flow reverse osmosis product available from Gradient Corp. of Boston, Massachusetts, USA) can be used to remove water from an aqueous source. As another example, thermal methods using heat pumps, hot exhaust, solar radiation, and multi-effect evaporators can also be used. Evaporation, for example using cooling towers, atomizers, sprayers, and Carrier Gas Extraction® (also available from Gradient Corp.), mechanical or forced circulation evaporators or solar concentrators, can also be used to precipitate impurities and evaporate water. Combinations of such processes can also be used. In the disclosure, "concentration" is generally used for any water removal process, ie a process raising concentration of all species present in a solution equally.

Various modes of filtration can also be used in addition to the concentration to remove unwanted larger solids from brine sources, before and/or after concentrating the aqueous source. The feed preparation stage 102 may be configured to provide a lithium concentration ratio between the stream exiting the preparation stage 102 and the feed entering the preparation stage 102 of at least 10, or 20. The feed preparation stage 102 may be configured to operate in different ways based on the lithium source, so that the feed preparation stage 102 generally provides a lithium stream having at least about 70 ppm, for example about 100 ppm, such as about 150-200 ppm lithium ions, predominantly countered by chloride ions, for direct extraction in the extraction stage 104, but higher concentrations of lithium could be used.

In an embodiment of the method, the feed preparation stage further comprises performing a purification process on the aqueous lithium source or the extraction feed to form a purified extraction feed. The feed preparation stage may include a purification process followed by a concentration process, or a concentration process followed by a purification process or a more complex combination, such as a first concentration process, a purification process and then a second concentration process. Each of the concentration processes may be as described in the disclosure, ie a membrane separation operation such as reverse osmosis, counter-flow reverse osmosis or both in combination, or an evaporation operation such as mechanical forced evaporation. The purification process may include one or more of the operations as described in relationship with the impurity stage, later in the specification, such as ion exchange, electrochemical process, solids removal, etc. In an embodiment the feed preparation stage includes a first concentration process using reverse osmosis, a purification process and a second concentration process using counter-flow reverse osmosis.

The direct extraction stage 104 generally operates as described above, either as an ion withdrawal process or an electrochemical separation process, or a combination thereof.

In the ion withdrawal process, the withdrawal material is typically a material, for instance a resin, with a composition or surface preparation that increases affinity for lithium ions relative to other ions. The withdrawal material is typically housed in a vessel, and multiple vessels of withdrawal material are typically used so some resin beds can be regenerated without stopping production. Regeneration typically involves treatment with a hot fluid to achieve substantial removal of all ions from the resin. Where surface treatments or exchange ions are used, the regeneration can also include re-application of the surface treatment or exchange ions prior to placing the withdrawal bed back into service.

Figure 5:
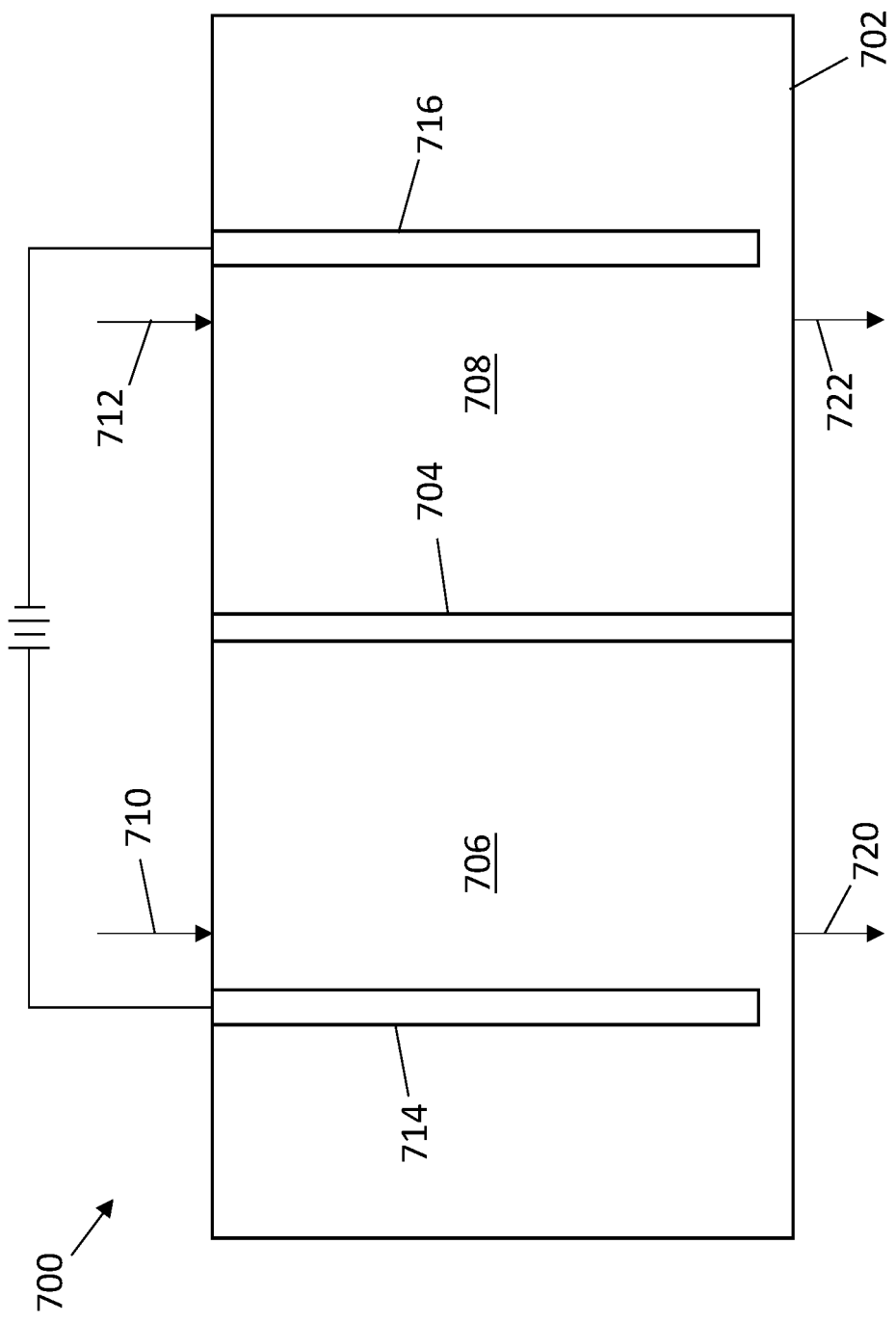
FIG. 5 is a schematic process diagram of an extraction stage according to one embodiment.

A recovery stream 109 is provided to the extraction stage to remove ions from the withdrawal material, thus forming a lithium intermediate 111. The recovery stream 109 operates as an eluent that elutes lithium ions from the withdrawal medium into the recovery stream 109. Flow rate of the recovery stream 109 is selected to concentrate lithium to a selected range, for instance of about 1,500 ppm to 3,000 ppm. Where low flow rate of the recovery stream 109 is used to achieve higher concentrations of lithium in the lithium intermediate 111, concentration of impurity ions can also increase in the extraction stage 104. The recovery stream 109 can be a water stream, which may be deionized, or a dilute brine stream having a low level of lithium ions, for example around 100 ppm. Selectivity for lithium ensures that impurity concentration rises less than lithium concentration.

Where the extraction stage 104 uses a lithium selective electrochemical separation process, the extraction feed 105 and the recovery stream 109 are brought into contact with opposite sides of a lithium selective membrane, as described above, and a voltage bias is applied across the membrane to perform direct extraction of lithium ions from the extraction feed. FIG. 5 is a schematic view of a lithium selective electrochemical separation cell 700, according to one embodiment. The cell 700 has an enclosure 702 that is separated into a first volume 706 and a second volume 708 by a lithium selective membrane 704 disposed within the enclosure 702. A lithium containing aqueous source is provided to the first volume 706 using a first volume inlet 710. A receiving stream is provided to the second volume 708 using a second volume inlet 712. A first electrode 714 is disposed to electrically couple to a material in the first volume 706. For example, the first electrode 714 may be disposed within the first volume 706, as shown in FIG. 5, or may be disposed on a wall of the first volume 706 or in a recess in fluid communication with the first volume 706. A second electrode 716 is disposed to electrically couple to a material in the second volume 708 in any of the ways described above with respect to the first electrode 714. A voltage bias is applied between the first electrode 714 and the second electrode 716 to provide an electric field between the first and second electrodes 714 and 716, within the first and second volumes 706 and 708, and across the membrane 704. Depending on the configuration of the membrane 704, the voltage bias may accelerate penetration of lithium ions through the membrane, while transport of other ions is either blocked or not accelerated as much as lithium ions. Alternately, the membrane 704 may be configured to block transport of lithium ions, so the electric field accelerates penetration of other ions relative to lithium. Application of the electric field thus enhances separation of lithium from other ions in the cell 700.

The material in the first and second volumes 706 and 708 is changed by transport of ions across the membrane 704 using the driving force provided by the electric field raised by the electrodes 714 and 716. The material of the first volume 706 is evacuated through a first volume outlet 720, and the material of the second volume 708 is evacuated through a second volume outlet 722. Depending on the configuration of the cell, the effluent from the first or second volumes 706 and 708 has increased lithium concentration relative to the corresponding feed material.

Where a membrane that is selectively permeable to lithium is used, current within the cell 700 is limited by lithium concentration in the first volume 706. Concentrating lithium in the material provided to the first volume 706, in such cases, for example up to a concentration of about 1,000 ppm or more, can increase separation rate and effectiveness. Reducing concentration of ions not transported by the membrane can also be useful to reduce buildup of material on the retentate side of the membrane, thus reducing the frequency of cleaning or maintenance operations. Effluent streams from RO desalination plants can be effectively treated using lithium selective electrochemical separation to recover lithium.

Where the cell 700 is used in the process 100, the extraction feed 105 is provided to one of the inlets 710 and 712 and the recovery stream 109 is provided to the other. A membrane that is selectively permeable to lithium ions is used in the cell for the process 100, such that lithium ions transport across the membrane from the extraction feed 105 to the recovery stream 109 while the extraction feed 105 is in contact with the first side of the membrane and the recovery stream 109 is in contact with the second, opposite, side of the membrane while the electric field enhances the ion transport.

Impurities are removed at an impurity stage 108. Divalent impurities, such as calcium, and magnesium, are typically removed or reduced in the impurity stage 108 but any other impurity, for instance, transition metals, could be removed or reduced at that stage. Impurity stage is a stage where impurity are selectively removed or reduced, reducing the concentration of such impurities, while lithium concentration substantially remains the same. Any combination of membrane separation, ion exchange, electrostatic separation, and precipitation, any of which can be selective to at least one type of impurities by using components made to be selectively permeable, chemically affinitive, non-permeable, or chemically non-affinitive for impurities, can be used. Some such components are described elsewhere herein. Prior to removing impurities, concentration of the impurities can be increased to a level that optimizes the volume of water handled by the impurity stage. For most aqueous lithium streams, impurity removal is found to be most effective where impurity concentration is higher, so the lithium intermediate 111 can be treated in an impurity preparation stage 106 prior to treatment at the impurity stage 108.

In the impurity preparation stage 106, water is first removed from some or all of the lithium intermediate 111 to form an impurity stage feed 113 having elevated ion (i.e. lithium and impurity) concentration, along with a first removed stream 121, which may be a water stream or brine stream. In other words, the impurity preparation stage concentrates the lithium intermediate. The impurity preparation stage 106 is generally operated to increase concentration of one or more impurities in the impurity stage feed to a value near the solubility limit of the one or more impurities in the impurity stage feed for example about 90% or 95% of the solubility limit. In an embodiment, the impurity preparation stage 106 is operated to raise a target divalent impurity, such as calcium, concentration in the impurity stage feed 113 to near the solubility limit in the eluent, for example about 90% or 95% of the solubility limit in the eluent. Removal of calcium, and other divalent ions, is then performed in the impurity stage 108 at near-optimal conditions to maximize removal of divalent impurities.

An example of impurity stage 108 includes solids filtration (for instance using clarification and/or filtering) for filtering the precipitated solids obtained during the impurity preparation stage 106. The impurity stage 108 may include additional stages such selective removal of residual impurities, such as capture of divalent impurities such as calcium and magnesium using a ion exchange resin, precipitative methods, or an electrochemical process with an appropriate membrane to partition impurities. An ultrafiltration membrane that rejects divalent ions could also be deployed. The impurity stage may also include additional precipitation stage to selectively precipitate some impurities using a chemical treatment, such as coagulation-flocculation, followed by solids removal as described above. Coagulation-flocculation may include the addition of $FeCl_3$ with a base to form a floc of $Fe(OH)_3$ used to remove suspended particles from the stream. The different treatments described herein as well as additional treatments for selectively removing any impurities may be implemented in any order. The impurity stage 108 results in a purified lithium stream 115 with high lithium concentration and very low concentration of impurities, such as divalent impurities. The impurity preparation stage 106 is optional and the method may include a impurity stage 108 without impurity preparation stage 106, in which case the lithium intermediate is routed to impurity stage 108.

As previously described for the preparation stage 102, any known way of raising concentration in an aqueous fluid may be used during impurity preparation stage 106. For example, membrane processes, such as reverse osmosis ("RO"), nano-filtration ("NF," sometimes also referred to as "loose" RO), and counter-flow reverse osmosis (CFRO® is a counter-flow reverse osmosis product available from Gradient Corp. of Boston, Massachusetts, USA) can be used to remove water from an aqueous source. As another example, thermal methods using heat pumps, hot exhaust, solar radiation, and multi-effect evaporators can also be used. Evaporation, for example using cooling towers, atomizers, sprayers, and Carrier Gas Extraction® (also available from Gradient Corp.), can also be used to precipitate impurities and evaporate water. Combinations of such processes can also be used. Various modes of filtration can also be used to remove unwanted larger solids from lithium sources. The impurity preparation stage 106 may be configured to provide a lithium concentration ratio between the stream exiting the impurity preparation stage 106 and the feed entering the impurity preparation stage 106 of at least 10, or 20. The impurity preparation stage 106 may be configured to operate differently with different compositions of the lithium intermediate stream 111, to increase concentration of one or more impurities in the feed to the impurity stage 108 to a value near the solubility limit of the one or more impurities, as set forth above.

The purified lithium stream 115 that exits the impurity stage 108 can be routed to a post-extraction concentration stage 110. The post-extraction concentration stage 110 raises the concentration of lithium by a factor of about 10.

The post-extraction concentration stage 110 produces a lithium concentrate 117 and one or more removed streams 119 that can be water streams, brine streams. The water and brine streams can be recycled to parts of the process 100 where ion concentrations are lower to facilitate processing. A portion of the lithium concentrate 117 can also be recycled and added to a lithium source to raise the lithium concentration of the lithium source and/or dilute impurities at the brine source. In an embodiment, the lithium concentrate 117 is routed to the conversion stage 112 that converts lithium chloride to lithium carbonate by adding sodium carbonate or directly to lithium hydroxide by electrochemical reaction.

Figure 7:
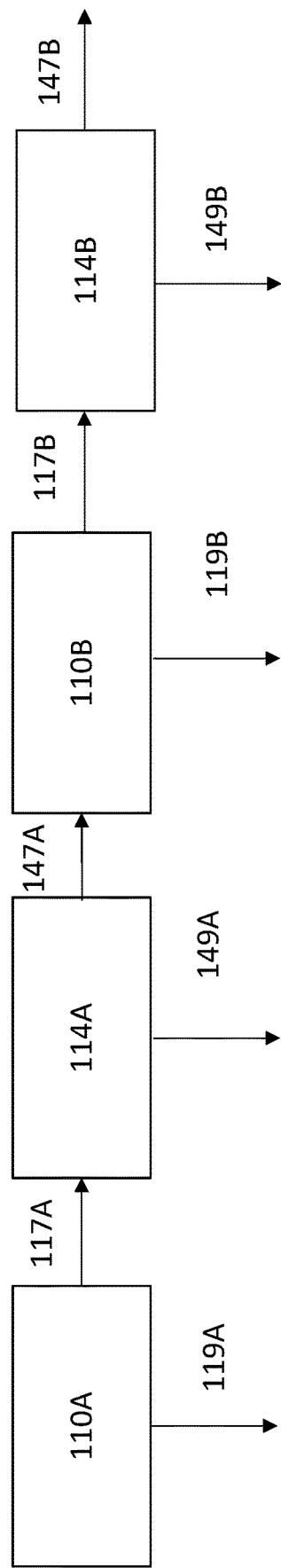
FIG. 7 is a schematic process diagram of a portion of a lithium recovery process.

In an embodiment, monovalent impurities can remain in the purified lithium stream 115. In such cases, the post-extraction concentration stage 110 also concentrates any monovalent impurities that remains in the purified lithium stream 115. Sodium and potassium have lower solubility limits in water than lithium, so concentrating the purified lithium stream 115 can precipitate sodium and potassium, which can be removed as solids in a solids removal stage taking place between post-extraction concentration 110 and conversion 112. In order words, lithium concentrate 117 is filtered and filtered lithium concentrate is routed to lithium conversion. In an embodiment, the method may include a plurality of post-extraction concentration stages 110A, 110B can be a multi-operation concentrator with solids removal 114A, 114B between stages as shown on FIG. 7. A multi-operation concentrator with integrated solids removal may then be used. The first post-extraction concentration stage 110A yields a first lithium concentrate 117A and a first brine (or low TDS) stream 119A that can be recycled elsewhere in the process. The first lithium concentrate 117A is routed to the first solids removal 114A that filters the precipitated solids within the second lithium concentrate as a first impurity slurry 149A. The first filtered lithium concentrate 147A is routed to the second post-extraction concentration stage 110B and is further concentrated, yielding a second lithium concentrate 117B and a second brine (or low TDS) stream 119B. The second lithium concentrate 117B is routed to the second solids removal 114B that filters the precipitated solids within the second lithium concentrate as a second impurity slurry 149B. The second filtered lithium concentrate 147B is routed to conversion 112. FIG. 7 exemplifies two concentration stages followed by solids removal but any number of concentration stage with intermediate solids removal stage may be used. Each concentration operation can be configured to raise the concentration of lithium until monovalent impurity solids (such as sodium) become a burden. Solids can then be removed using any filtration process and further concentration can proceed. The aqueous lithium sources contemplated for use in the process 100 can have sodium concentration several orders of magnitude higher than lithium concentration, for example at least 100 or at least 1,000 times the lithium concentration, so the post-extraction concentration stage 110 and solids removal stage can be quite effective in removing large quantities of sodium with relative ease. Moreover, as lithium concentration increases, solubility of sodium ions declines, so each absolute increment of increased lithium concentration yields more sodium precipitation. Sodium overwhelmingly precipitates as chloride salt in the post-extraction concentration stage 110, and solids can be removed by any suitable process including settling, centrifugation, vortex separation, and the like in the solids removal stage. At higher lithium concentrations, the most extreme filtration processes may become untenable due to the concentration of lithium ions, but processes such as evaporation and seeding can be used to remove water and precipitate sodium and potassium. The solids removal stage is an optional stage.

In one embodiment, a series of membrane separations is performed during the post-extraction concentration stage 110 to separate the lithium concentrate 117 with high lithium concentration, as a non-permeating stream, from a stream with low lithium concentration, as a permeating stream. The non-permeating stream, in this case, will also contain most impurities from the purified lithium stream 115. A vaporizer may alternatively or additionally be used to carry out both post-extraction concentration stage 110 to further concentrate the lithium salt in the lithium concentrate 117 and solids removal stage 114. The vaporizer yields a vaporizer water stream (equivalent to low TDS stream 119), which can be recycled to parts of the process, as explained below, an impurity stream, which contains non-lithium cations such as sodium, potassium, magnesium, manganese, calcium, and the like (that is equivalent to the impurity slurry 149 of FIG. 7). The vaporizer also yields the filtered lithium concentrate 147.

The concentration stage 110 produces a lithium concentrate 117 and one or more removed streams 119 that can be water streams, brine streams, and/or salt slurries. The water and brine streams can be recycled to parts of the process 100 where ion concentrations are lower to facilitate processing. A portion of the lithium concentrate 117 can also be recycled and added to a lithium source to raise the lithium concentration of the lithium source and/or dilute impurities at the brine source.

Figure 2:
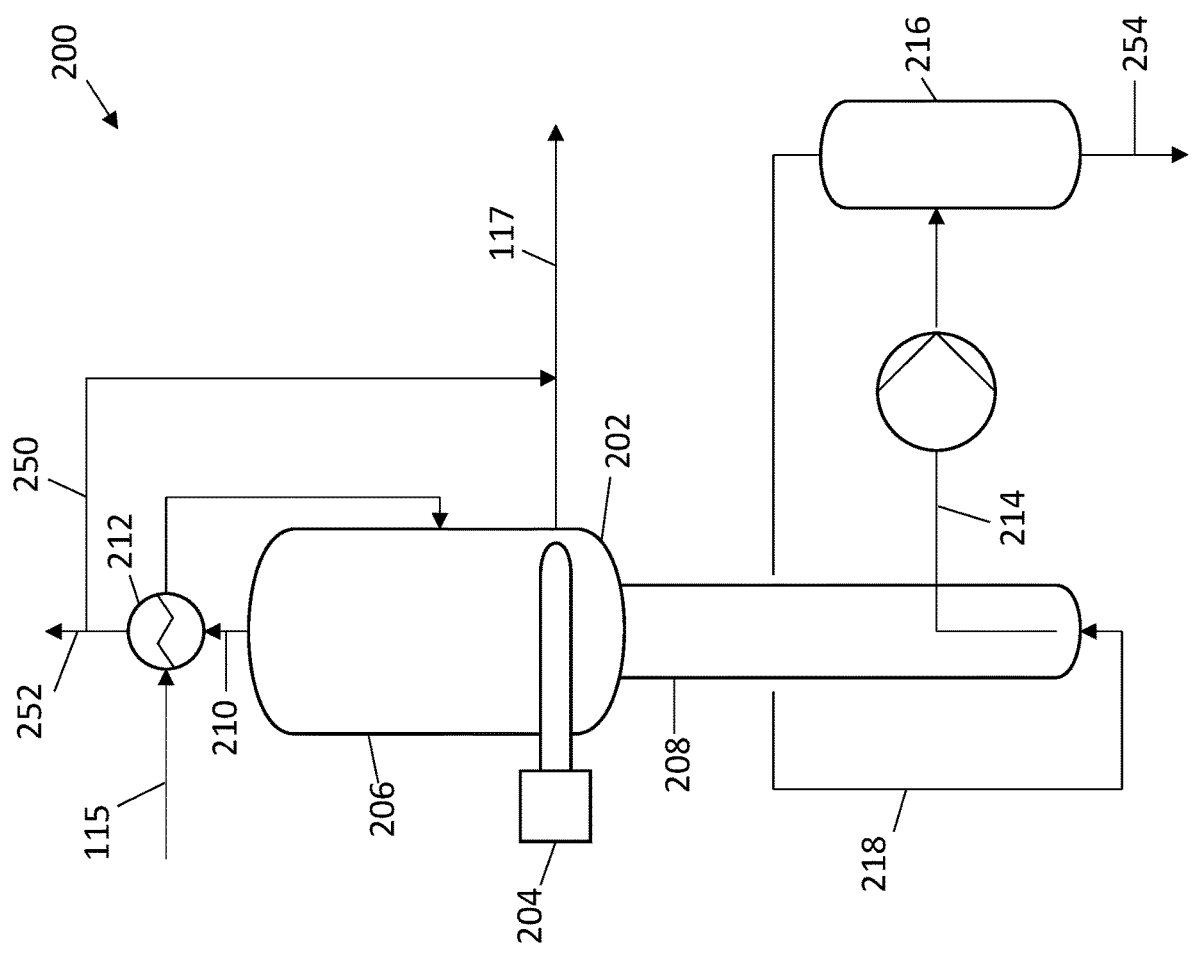
FIG. 2 is a schematic diagram of a vaporizer usable during a concentration stage of the process shown in FIG. 1

FIG. 2 is a schematic process diagram of a vaporizer 200 that can be used as, or as part of, the post-extraction concentration stage 110 and the solids removal stage 114. The example vaporizer 200 allows concentration of lithium and removal of solids. The vaporizer 200 includes a vaporization vessel 202 that receives the purified lithium stream 115. Heat is applied to the purified lithium stream 115 within the vaporization vessel 202 to vaporize water and concentrate lithium and other ions within the vessel 202. A heater 204 is coupled to the vessel 202 to apply heat to the fluid within the vessel 202. The heater 204 is shown here schematically as an element inserted into the interior of the vessel 202, but heat input can be accomplished in any convenient manner.

The vessel 202 generally has a vaporization section 206 and a precipitation section 208. Solids precipitate from the fluid as water is vaporized and solubility limits are reached. The vaporizer 200 is therefore also a precipitator of solids. Sodium precipitates as chloride, and potentially other salts due to trace amounts of other anions. Lithium generally remains in a concentrated solution, but some lithium salts can precipitate if enough water is removed by evaporation. Sodium solids generally settle below the lithium-rich solution due to density. The lithium solution is removed as the lithium concentrate 117, which is removed from a lower part of the vaporization section 206. Vaporized water is removed in an overhead stream 210 of the vaporization section 206. Heat is recovered from the vaporized water by thermally contacting the vaporized water with the purified lithium stream 115 in a heat exchanger 212. The heated purified lithium stream 115 is provided to the vaporization section 206 of the vessel 202, optionally using a valve or orifice to flash the heated purified lithium stream 115 within the vaporization section 206. The vaporized water is at least partially condensed in the heat exchanger 212, and a portion 250 of the vaporized water may be added to the lithium concentrate 117 to ensure all solids are dissolved prior to routing the lithium concentrate 117 to the conversion stage 112 of the process 100 (FIG. 1). The remaining vaporized water exits as the vaporizer water stream 252, which can be, or can be included in, one of the removed streams 119.

Sodium solids, mainly chloride, along with other impurities such as calcium, potassium, magnesium, and manganese, also including any anion impurities, also precipitate in the vaporization section 206 of the vessel 202, and due to higher density than the concentrated lithium solution settle into the precipitation section 208. Note that the vaporization section 206 of the vessel 202 is sized to provide residence time for sodium precipitates to settle into the precipitation section 208. A precipitate stream 214 is withdrawn from a lower portion of the precipitation section 208 and pumped to a settling vessel 216. The sodium solids, along with other dense impurities, settle in the settling vessel 216 and are removed as an impurity stream 254. Separated water or brine may be withdrawn from the settling vessel 216 and returned to the vaporization vessel 202 as a vaporization return stream 218 or recycled to any other location in the process (as explained below). Such vaporization return stream may be, or may be another part of, the removed stream 119. In this case, the water or brine is returned at the bottom of the precipitation section 208 to fluidize solids that may collect at the bottom of the precipitation section 208. The water or brine, or a portion thereof, can be returned to the vaporization vessel 202 at other points, or may be routed to other uses.

Figure 3:
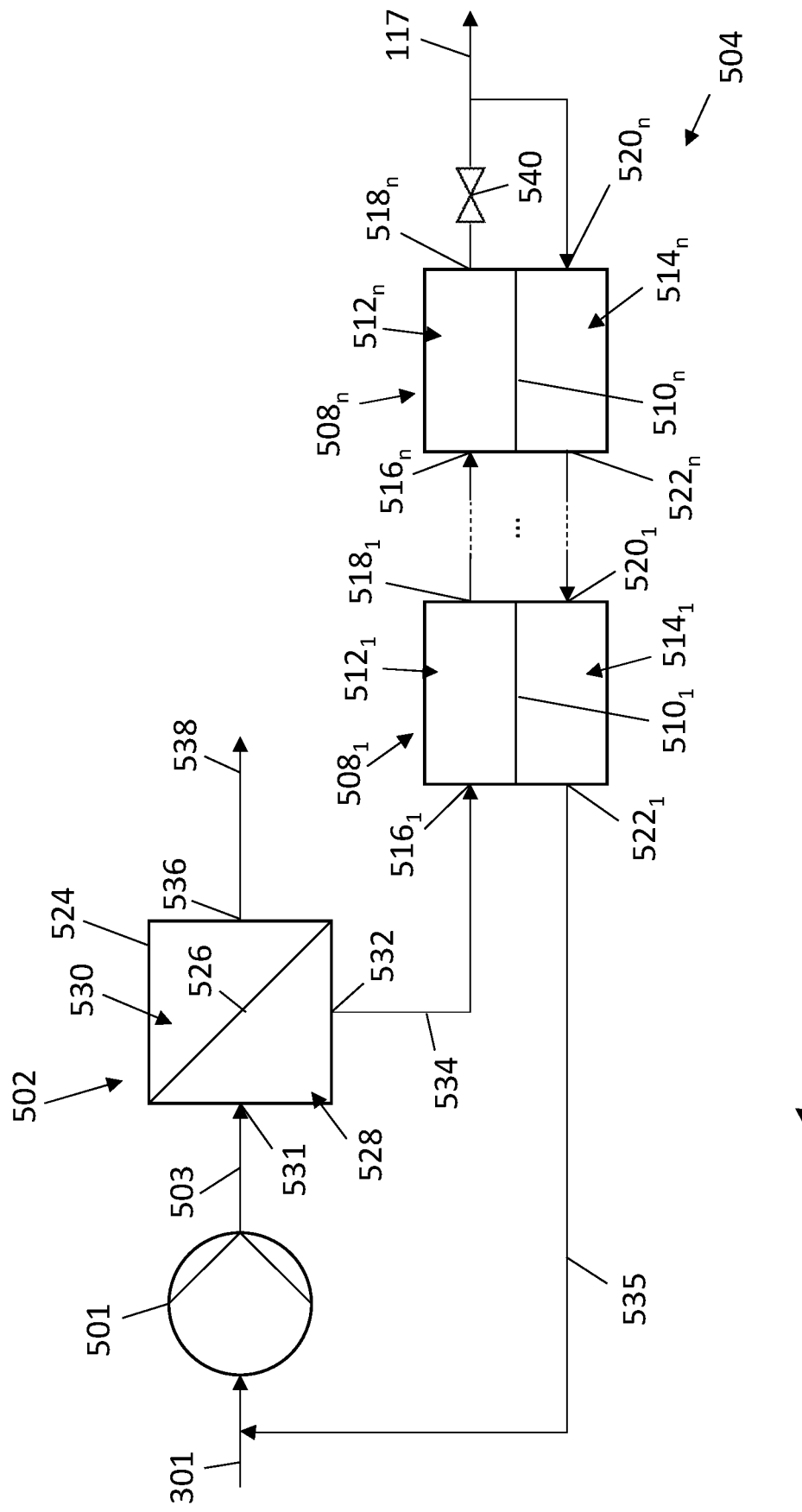
FIG. 3 is a schematic process diagram of a concentration stage of a lithium recovery process according to one embodiment.
Figure 4:
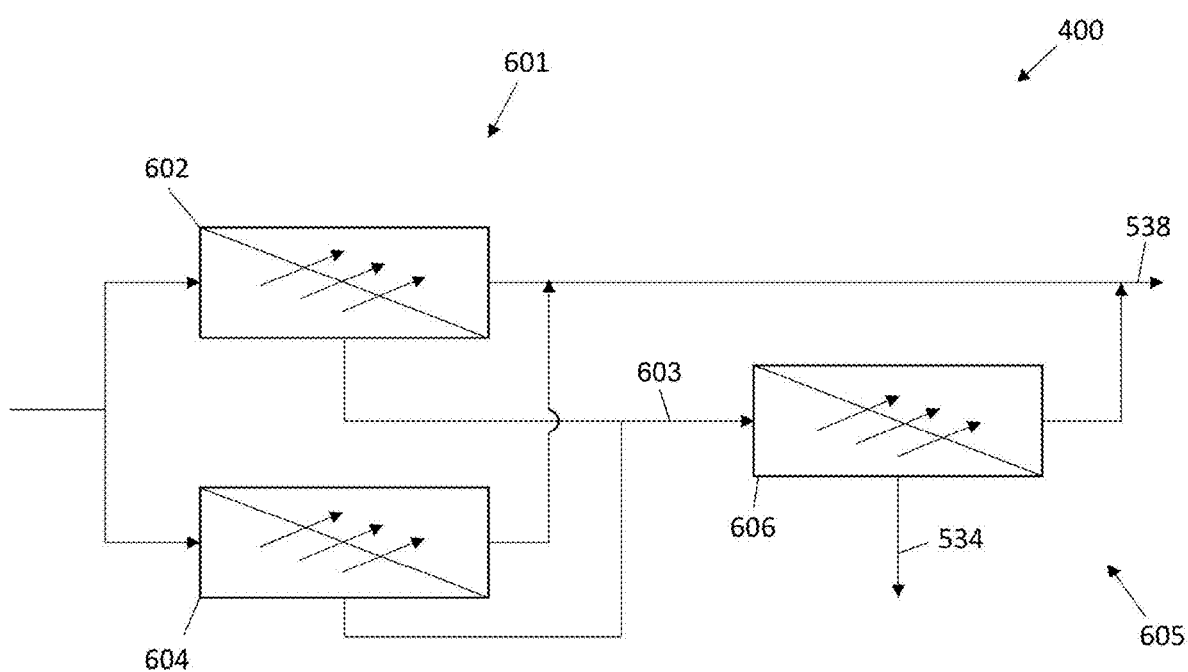
FIG. 4 is a schematic process diagram of a portion of a concentration stage of a lithium recovery process according to another embodiment.

FIGS. 3 and 4 are schematic process diagrams showing embodiments of a concentration stage, for instance a post-extraction concentration stage 110. In FIG. 3, a concentration stage 300 includes two different membrane separation operations in series: a reverse osmosis operation 502 and a counter-flow reverse osmosis operation 504. In this embodiment, the reverse osmosis operation 502 is upstream from the counter-flow reverse osmosis operation 504. A lithium containing stream 301, which can be the aqueous source, lithium intermediate 111 or the purified lithium stream 115 (FIG. 1), is pressurized to a target pressure (preferably less than or equal to 2000 psi) using a pump 501 to yield a pressurized stream 503, which is then provided to the reverse osmosis operation 502.

The reverse osmosis operation 502 is represented as including a RO container 524 that has a semi-permeable membrane 526 disposed therein, which may be a lithium selective membrane. The semi-permeable membrane 526 may be a reverse osmosis membrane, a nanofiltration membrane or more generally any type of membrane that enables water molecules to permeate while lithium ions mostly do not permeate. The membrane 526 separates the RO container 524 into a first volume 528 that receives a stream to be concentrated, here the pressurized stream 503, and a second volume 530 where permeating water molecules collect. The pressurized stream 503 enters the RO container 524 via an inlet 531 to the first volume 528. The RO container 524 also has a first outlet 532 of the first volume 528 through which a preconcentrated stream 534 containing a higher concentration of lithium than the pressurized stream 503 or the lithium containing stream 301 exits the RO container 524, and a second outlet 536 of the second volume 530 through which a dilute stream 538, having a lower concentration of lithium, that passed through the membrane (i.e. a permeate stream) exits the RO container 524.

The reverse osmosis operation 502 is represented in one stage with one container but it can also be in several stages, including a plurality of containers with identical or different semi-permeable membranes therein arranged in series. In such embodiments the preconcentrated stream 534 exiting a first RO container can be directed to the inlet of a second RO container to further concentrate the preconcentrated stream before a final preconcentrated stream is routed to the counter-flow reverse osmosis operation. In other such cases the permeate stream 538 can be directed to the inlet of an additional RO to container to desalinate the permeate stream 538. In still other embodiments, the reverse osmosis operation 502 may include a plurality of RO containers arranged in parallel.

FIG. 4 is a schematic process diagram of a reverse osmosis operation 400 that can be used as the reverse osmosis operation 502 (FIG. 3). The reverse osmosis operation 400 has a first stage 601, which is a parallel stage having two RO containers 602, 604 (more than two can also be used) in parallel and a second stage 605 in series with the first stage 601 and having a RO container 606 (more than one RO container in series can also be used here) configured to receive a concentrated stream (i.e. a non-permeate stream) 603 of each RO container 602 and 604 as input. The RO container 606 of the second stage 605 further concentrates the concentrated streams 603 to yield the preconcentrated stream 534 (FIG. 3). The reverse osmosis operation 400 is presented as an example of a way to arrange multiple RO containers in a reverse osmosis operation such as the reverse osmosis operation 502. Using RO containers in series during reverse osmosis operation 502 can reduce the number of stages of the counter-flow reverse osmosis operation 504 as well as maximize permeate recovery, that can be re-used into the process as explained above, therefore reducing fresh water demand. Indeed, the permeate of each container in this case may be recycled to one or more stages of the process, in particular as eluent of the lithium extraction stage 104.

Referring again to FIG. 3, the counter-flow reverse osmosis operation 504 uses a plurality of n units $508_1$-$508_n$, in series, each unit comprising a semi-permeable membrane $510_1$-$510_n$, each of which may be a lithium selective membrane. Each semi-permeable membrane 510 may be a reverse osmosis membrane, a nanofiltration membrane or more generally any type of membrane that selectively enables water molecules to permeate while lithium ions mostly do not permeate. The units 508 may all have the same type of membrane or different types of membranes. Each membrane $510_1$-$510_n$ separates each respective unit $508_1$-$508_n$ into a first volume $512_1$-$512_n$ to receive a stream to be concentrated, here a stream derived from the lithium containing stream 301, and a second volume $514_1$-$514_n$ to receive a permeating stream. The material that remains in the first volume 512 of each unit 508 is a non-permeating stream. Each unit comprises a first inlet $516_1$-$516_n$ to receive the stream to be concentrated and a first outlet $518_1$-$518_n$ to exit the concentrated stream (non-permeate stream) from the unit. Each unit 508 also has a second inlet $520_1$-$520_n$ to receive the permeating stream of another sequential unit and a second outlet $522_1$-$522_n$ to exit the permeating stream from the unit. Thus, for the units $508_1$-$508_{n-1}$, the non-permeating stream of the unit exits the first volume 512 of the unit and flows to the respective first volume 512 of the next unit in the series.

The preconcentrated stream 534 derived from the pressurized stream 503 (ultimately derived from a lithium bearing stream of the process 100, such as the lithium intermediate 111 or the purified lithium stream 115) and permeating streams of the units 508 flow in counter-current directions. That is, the non-permeating streams flow from unit 1 to unit n, generally through the first volumes 512, while the permeating streams flow from unit n to unit 1, generally through the second volumes 514. The final non-permeating concentrated stream is collected at the first outlet $518_n$ of the $n^{th}$ unit $508_n$ and forms the lithium concentrate 117 (when using the operation 504 as the post-extraction concentration stage 110 of the process 100). The final permeating stream is collected at the second outlet $522_1$ of the first unit $508_1$ and yields a dilute brine stream 535 that may be recycled into the counter-flow reverse osmosis operation and/or recycled to one or more other stages of the process 100, for instance as a strip solution or as an eluent, for example with the recovery fluid 109, in the extraction stage. Under some circumstances, the final permeating stream collected from the second volume of the first unit $508_1$ may be a fresh water stream having TDS less than about 2000 mg/l. The number of stages n may be between 2 and 10, optionally between 3 and 6 to limit the costs while concentrating the stream to a target concentration. The concentration stage may also include a plurality of the counterflow reverse osmosis operations 504 in parallel, each handling a portion of the flow to be concentrated.

In the embodiment shown in FIG. 3, the concentration stage 300 first comprises the reverse osmosis operation 502. The preconcentrated stream 534 is directed to the counter-flow reverse osmosis operation 504, while the permeate stream 538 that has a low TDS (less than 2,000 mg/l, preferably less than 500 mg/l and preferably around 100 mg/l) can be recycled to another stream of the process 100, for instance in the extraction stage 104 as eluent, for example with the recovery fluid 109, or any other stage of the process 100 where fresh water can be used. During the counter-flow reverse osmosis operation 504, the preconcentrated stream 534 passes through the n units $508_1$-$508_n$ and the resulting final non-permeating stream is collected at the first outlet $518_n$ of the $n^{th}$ unit $508_n$. The final non-permeating stream is depressurized, for example using a valve 540 or an orifice, and separated into a first portion that forms the lithium concentrate 117 (when used in the post-extraction concentration stage 110) and a second portion that is sent back to the units $508_1$-$508_n$ to flow through the second volumes 514 thereof along with permeating material. Using a lithium concentrate portion as a permeating stream in counter-flow reverse osmosis 504 increases operation efficiency. The depressurization may enable energy recovery by using the pressure of the final non-permeating stream exiting the $n^{th}$ first outlet $518_n$ to drive, for example, a generator coupled with a turbine.

In each unit 508, the lithium concentration of the non-permeating stream increases while the lithium concentration of the permeating stream decreases. That is, the non-permeating stream exiting unit m of the counter-flow reverse osmosis operation 504 at the respective first outlet $518_m$ has higher lithium concentration than the non-permeating stream exiting unit m-1 at first outlet $518_{m-1}$. Also, the permeating stream exiting unit m of the counter-flow reverse osmosis operation 504 at the respective second outlet $522_m$ has higher lithium concentration than the permeating stream exiting unit m-1 at second outlet $522_{m-1}$. Said another way, lithium concentration increases, in the operation 504, in streams flowing toward the $n^{th}$ unit and decreases in streams flowing toward the first unit. The dilute brine stream 535 may be recycled to the concentration stage 300 to recover any residual lithium in the dilute brine stream 535, or to any preceding stage of the process 100, as shown in FIG. 1. In the concentration stage 300, the dilute brine stream 535 can be mixed with the lithium containing stream 301. In another embodiment, the concentration stage 300 may include only the counter-flow reverse osmosis operation 504 and no reverse osmosis operation 502 depending on lithium concentration in the lithium intermediate 111 and target concentration of the lithium concentrate 117. In such case, a portion or all of the dilute brine stream 535 may be recycled to another stage of the process 100.

A concentration stage including counter-flow reverse osmosis operation 504, such as the concentration stage 300, enables a concentration ratio between the stream exiting the $n^{th}$ unit and the stream entering the first unit, of 2 to 20. The concentration of the dilute brine 535 may be reduced to the point that a concentration ratio between the dilute stream entering the nth unit and the dilute stream exiting the first unit is 2 to 20. The stream entering the counter-flow reverse osmosis operation 504, for example the preconcentrated stream 534, has preferably a lithium concentration between 0.05% and 6% by weight, preferably between 0.5 and 3%. The lithium concentrate stream 117 at the exit of the counter-flow reverse osmosis operation 504 has a TDS (total dissolved solids) over 120,000 mg/l preferably over 200,000 mg/l and a lithium concentration over 2% by weight, preferably over 3.3% by weight. The dilute brine 535 at the second outlet $522_1$ of the first unit $508_1$ of the counter-flow reverse osmosis operation 504 has preferably a lithium concentration of less than 2% by weight, preferably less than 1.5% by weight. The counter-flow reverse osmosis operation 504 results in increased lithium concentration in the lithium concentrate 117, compared to a more conventional method such as simple reverse osmosis operation, by 3 to 4 orders of magnitude, allowing recovery of more than 80%, preferably more than 90%, of the volume of the lithium intermediate 111 as the dilute brine stream 535, when used as the post-extraction concentration stage 110 of the process 100. The counter-flow reverse osmosis operation 504 is an example of a second membrane separation operation that increases TDS to over 120,000 mg/l. However, a second membrane separation operation having different configuration and setup may also be used to reach such concentration, using for instance different equipment, or flow pattern, etc. Such operation is also covered by the current disclosure.

Combining a reverse osmosis operation 502 and a counter-flow reverse osmosis operation 504 limits the capital cost of the concentration stage by limiting the number of units in the counter-flow reverse osmosis operation. Furthermore, combining the operations 502 and 504 results in a dilute stream of the reverse osmosis operation 502 that can be recycled as an eluent in the lithium extraction operation, significantly reducing the fresh water needed in the extraction stage 104 (fresh water being mainly used as the recovery fluid 109). In some cases, the dilute brine stream 535 can be recycled into a dilute brine target feed to one of the aqueous lithium source, the extraction feed 105, the lithium intermediate 111, the impurity stage feed 113, or the purified lithium stream 115. The permeate stream 538 has a low lithium concentration and low TDS and is an efficient eluent whereas the dilute brine stream 535 may have a higher TDS that may not directly enable to elute lithium efficiently from the withdrawal material of the extraction stage 104 in some cases, or may pose higher barrier to diffusion of lithium through a membrane in an electrochemical process. In such cases the dilute brine stream 535 can be mixed with another stream having lower TDS, can be subjected to impurity removal before being used as eluent, or can otherwise be adjusted in composition for a target stream or operation of the process 100 to target a lithium concentration or ratio of lithium concentration to impurity concentration. A lower TDS stream, such as the permeate stream 538 can also be adjusted to target a lithium concentration or a ratio of lithium concentration to impurity concentration for a target stream or operation of the process 100.

In one additional embodiment, the dilute brine stream 535 may be treated using a separate reverse osmosis operation independent from the concentration stage 300 (downstream of the counter-flow reverse osmosis operation 504). In such cases, the reverse osmosis operation 502 can be optional. Any configuration or variation that concentrates lithium and yields fresh water (i.e. a water stream with TDS below 2,000 mg/l) that can be recycled elsewhere can be used as a post-extraction concentration stage 110.

The configuration of FIGS. 3 and 4 described in relationship with the post-extraction concentration stage 110 may be also be used to increase lithium concentration as part of the feed preparation stage 102 or impurity removal preparation stage 106. Where such a concentration configuration is used in the feed preparation stage 102, the aqueous lithium source is the inlet stream to the RO container 524 and the feed for extraction is collected exiting the counter-flow reverse osmosis operation 504. A permeate stream, such as the permeate stream 538 obtained from the reverse osmosis operation 502, may also be recycled to other stages of the process 100 as described elsewhere in the application. When the feed preparation stage includes a first concentration process being reverse osmosis, a purification process and a second concentration process being counter-flow reverse osmosis, the feed preparation stage may be as described in relationship with FIGS. 3 & 4, with an intermediate purification process on the preconcentrated stream to yield a purified preconcentrated stream that enters the counter-flow reverse osmosis in the volume $512_1$ of the first unit $508_1$.

Where such configuration is used in the impurity preparation stage 106, the lithium intermediate 111 is the inlet stream to the RO container 524 and the impurity stage feed 113 is collected exiting the counter-flow reverse osmosis operation 504. The first removed stream 121 then corresponds to the permeate stream 538 obtained from the reverse osmosis operation 502 that may also be recycled to other stages of the process 100 as described elsewhere herein.

Referring again to FIG. 1, multiple streams can be recycled in the process 100 to manage the concentration of lithium at each stage of the process 100 and to manage a ratio of lithium ions to impurity ions at each stage of the process, so that each stage of the process 100 can operate in an optimal range. The composition of each stream transferred from one unit of the process 100 to another can be targeted to improve performance of the receiving unit. Thus, the impurity preparation stage 106 and the post-extraction concentration stage 110 produce respective removed streams 121 and 119, which can be recycled to the recovery stream 109. Each of the removed streams 121 and 119 can be water or dilute brine streams. The impurity stage 108 can also generate a water or dilute brine removed stream 123, depending on the type of impurity reduction processes performed in the impurity stage 108.

Each of the removed streams 119, 121, and 123, or portions thereof, can, independently be returned to any stage of the process 100 to manage composition profile of lithium and impurity ions across the process 100 for optimal operation. All or part of any of the removed streams 119, 121, and 123 can, independently, be routed to the recovery stream 109 or to a first return 135 located in the lithium intermediate 111 between the extraction stage 104 and the impurity preparation stage 106. All or part of any of the removed streams 119 and 123 can, independently, be routed to a second return 137 located in the impurity stage feed 113 between the impurity preparation stage 106 and the impurity stage 108. The removed stream 119, or portion thereof, can be routed back to a third return 139 located in the lithium intermediate stream 115 between the impurity stage 108 and the post-extraction concentration stage 110. The removed streams are generally recycled backward in the process 100 to avoid sending streams with higher quantities of impurities forward in the process 100 toward the finished product end of the process 100. Recycling the removed streams 119, 121, and 123 can manage water loading in the process 100 and minimize the need to make up water for processing.

Each of the intermediate streams 113, 115, and 117, or portions thereof, can also be returned to any stage of the process 100 in an impurity feed recycle 125, a concentrator feed recycle 127, and a lithium concentrate recycle 129, respectively. All or part of any of the recycle streams 125, 127, and 129 can be returned to a fourth return 133 located in the extraction feed 105 between the feed preparation stage 102 and the extraction stage 104. All or part of any of the recycle streams 125, 127, and 129 can be returned to a fifth return 131 located in the lithium intermediate 111 between the extraction stage 104 and the impurity preparation stage 106. All or part of any of the recycle streams 127 and 129 can be returned to a sixth return 141 located in the impurity feed stream 113 between the impurity preparation stage 106 and the impurity stage 108. All of part of the recycle stream 129 can be returned to a seventh return 143 located in the concentrator feed 115 between the impurity stage 108 and the post-extraction concentration stage 110.

The recycle streams 125, 127, and 129 have increasing lithium concentration and decreasing impurity concentration. The removed streams 119, 123, and 121 are generally water or dilute brine streams. These various streams are used to tune compositions at targeted locations in the process 100 to optimize performance of the individual units of the process 100. For example, where a ratio of lithium to impurities in a particular process stream is lower or higher than optimal for performance of the unit immediately downstream, a low- or high-ion-concentration stream from a downstream location of the process can be selected to blend with the process stream to optimize the composition of the process stream.

The lithium concentrate 117 is routed to a conversion stage 112 to convert lithium chloride to lithium carbonate or lithium hydroxide, yielding a lithium product 145. The conversion can be performed by known chemical, electrochemical, and hybrid processes. The lithium product 145 can be a lithium hydroxide product or a lithium carbonate product. The lithium product 145 can be a liquid solution of lithium hydroxide or lithium carbonate, a slurry of solid lithium hydroxide in a solution of lithium hydroxide, or a slurry of lithium carbonate in a solution of lithium carbonate.

Figure 6A:
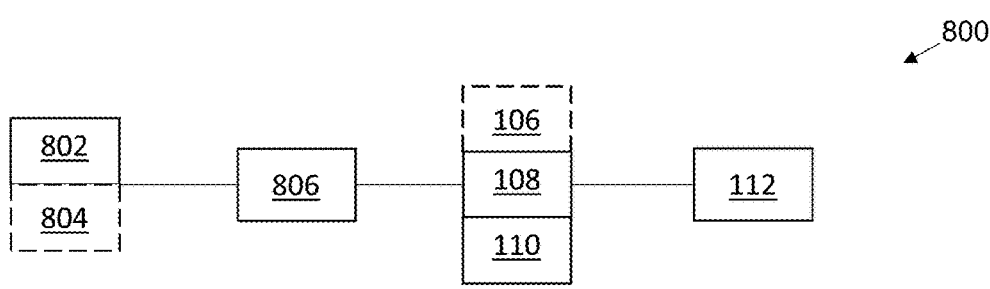
FIG. 6A-6C are schematic process diagrams of a lithium recovery process according to additional embodiments.

FIG. 6A is a schematic process diagram illustrating a process 800 according to one embodiment. The process 800 uses a concentration process 802, and optionally a purification process 804, in either order (with the purification process 804 shown in phantom conjoined with the concentration process 802 to illustrate that the processes can be performed in either order), as the preparation stage 102, a lithium selective electrochemical separation process 806 as the extraction stage 104, and optionally any of the impurity stage 108, and/or the impurity preparation stage 106, and/or post-extraction concentration stage 110, followed by the conversion stage 112. These various stages are substantially as described above, and vaporization can be used in the post-extraction concentration stage 110. The concentration process 802 can be a vaporization process, a filtration process, a membrane process, a CFRO process, a combination of a reverse osmosis and CFRO process or other suitable water-removal process as disclosed hereinabove. The purification process can be an ion-separation process, such as a selective membrane process or a chemical treatment, with solids removal.

Figure 6B:
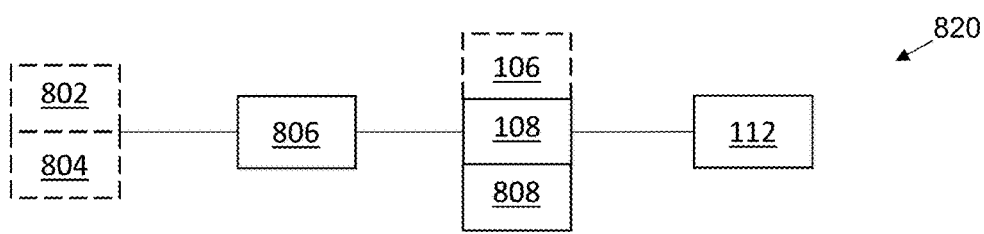

FIG. 6B is a schematic process diagram illustrating a process 820 according to another embodiment. The process 820 optionally uses concentration and purification processes 802 and 804, in either order, as the optional preparation stage 102, the lithium selective electrochemical separation process 806 as the extraction stage 104, a CFRO process 808 optionally in combination with a reverse osmosis process as the concentration stage 110, optional impurity removal stage 108 and optional impurity preparation stage 106 before the CFRO process 808, followed by the conversion stage 112.

Figure 6C:
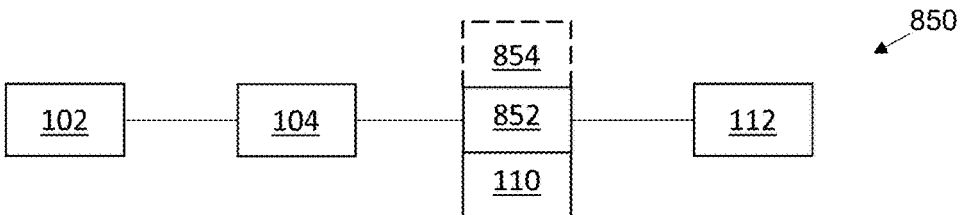

FIG. 6C is a schematic process diagram illustrating a process 850 according to another embodiment. The process 850 is like the process 820, except that the extraction stage 104 is a withdrawal-type extraction stage and a lithium selective electrochemical separation process 852 is used for the impurity stage 108, with a CFRO process 854 used as the impurity preparation stage 106. The processes 6A-6C illustrate the use of different separation processes together to recover lithium under different circumstances.

Methods of lithium recovery that use a preparation stage 102 and an extraction stage 104 can use an impurity stage 108 with or without the impurity preparation stage 106, and with or without the post-extraction concentration stage 110. Thus, the lithium intermediate 111 can be routed directly to the conversion stage 112, or to the post-extraction concentration stage 110, or to the impurity removal stage 108. Methods described herein can have a preparation stage 102 and an extraction stage 104 directly followed by an impurity removal 108 without impurity preparation 106, where the lithium intermediate 111 is routed directly to the impurity stage 108. Other methods described herein can have a preparation stage 102 and an extraction stage 104 directly followed by a post-extraction concentration stage 110 without an impurity preparation stage 106 or an impurity stage 108, where the lithium intermediate 111 is routed directly to the post-extraction concentration stage 110). Methods described herein can also have an extraction stage 104, an impurity preparation stage 106, an impurity removal stage 108, and a post-extraction concentration stage 110 followed by a conversion stage 112.

The disclosure relates to a method of recovering lithium from a lithium source, comprising extracting lithium from an extraction feed using direct lithium extraction in an extraction stage to yield a lithium intermediate; performing one or more concentration operations, each concentration operation concentrating an input stream to yield an output feed. The input stream is obtained from the lithium intermediate and/or the extraction feed is obtained from the output feed. At least one of the concentration operations includes a counter-flow reverse osmosis operation. The method also includes generating a low TDS stream as a permeate from any of the one or more concentration operations, wherein the low TDS stream is recycled, ie directed to any operation of the method, especially having a fresh water need, or used as fresh water. The low TDS stream has a TDS under 2,000 mg/l, preferably under 500 mg/l.

One or more concentration operations may include a reverse osmosis operation upstream of a counter-flow reverse osmosis operation. The reverse osmosis separates the input stream into a preconcentrated stream and a permeate stream using a semi-permeable membrane, wherein the permeate stream is the low TDS stream.

The counter-flow reverse osmosis operation may include flowing the preconcentrated stream into a plurality of reactors in series, each containing a semi-permeable membrane separating the reactor into a first volume and a second volume. The preconcentrated stream flows sequentially as a non-permeating stream into the first volume of each reactor and a permeating stream flows sequentially into the second volume of each reactor counter-current to the non-permeating stream. The non-permeating stream exiting the plurality of reactors yields a concentrated stream and the permeating stream exiting the plurality of reactors yields a dilute brine stream.

The dilute brine stream may be recycled into the reverse osmosis operation.

The at least one concentration operation may include pressurizing the input stream, especially before the counter-flow reverse osmosis operation, and preferably at a target pressure lower than membrane threshold pressure, in particular below 2000 psi. In an embodiment, the at least one concentration operation may include pressurizing the input stream before the reverse osmosis operation and depressurizing the permeating stream before flowing it into the second volume of the plurality of reactors.

The at least one concentration operation may include a feed preparation operation, wherein the input stream is an aqueous lithium source and the output feed is the extraction feed. The feed preparation operation takes place upstream of the extraction stage.

In an embodiment, the method includes feed performing a purification process on the aqueous lithium source or the extraction feed or a derivative thereof. The method may further comprise performing a purification process on the aqueous lithium source or the extraction feed to form a purified extraction feed, wherein extracting lithium from the extraction feed, or a derivative thereof, comprises extracting lithium from the purified extraction feed.

In an embodiment, the method comprises concentrating the aqueous source to yield a preconcentrated extraction feed in a first concentration process, such as a reverse osmosis process, performing the purification process on the preconcentrated extraction feed to yield a purified preconcentrated extraction feed, and concentrating the purified preconcentrated extraction feed using a second concentration process, such as a counter-flow reverse osmosis process, to yield the extraction feed. In this embodiment, the first and second concentration process may be any of the process described hereinabove, such as any membrane separation operation or evaporation operation. The purification process may be any combination of impurity precipitation, solids removal and divalent impurity selective removal.

The at least one concentration operation may include concentrating a stream derived from the lithium intermediate as the input stream to yield a lithium concentrate as the output feed. Such a concentration operation takes place downstream of the extraction stage, directly on the lithium intermediate or on a stream corresponding to the lithium intermediate that has undergone one or more additional operations. In an embodiment, the stream derived from the lithium intermediate is a first stream, and the method further comprises treating a second stream derived from the lithium intermediate in an impurity stage to remove impurities, and forming a purified lithium stream, wherein the first stream is the purified lithium stream. In other word there might be an impurity treatment operation (ie impurity stage) between the extraction stage and the concentration stage.

In such embodiment where there is an impurity stage, the one or more concentration operations may further include an impurity preparation stage. In such stage, the input stream is the lithium intermediate and the output feed is an an impurity stage feed, and the second stream (ie undergoing the impurity stage) is the impurity stage feed. In an embodiment, concentrating the lithium intermediate in the impurity preparation stage comprises increasing concentration of one or more impurities in the lithium intermediate to at least 90% of the solubility limit of the one or more impurities in the lithium intermediate The method may further comprise converting lithium in the lithium concentrate to a lithium product. In particular, the lithium chloride in the lithium concentrate is converted to lithium carbonate and/or hydroxide. In an embodiment, the method includes routing the lithium concentrate or a derivative thereof to a solids removal stage, wherein the solids removal stage removes solids from the lithium concentrate to yield a filtered lithium concentrate and routing the filtered lithium concentrate or a derivative thereof to conversion. In an embodiment, the method includes a first post-extraction concentration stage yielding a first lithium concentrate, a first solids removal stage removing solids from the first lithium concentrate or a derivative thereof to yield a first filtered lithium concentrate, a second post-extraction concentration stage concentrating the first filtered lithium concentrate or a derivative thereof to yield a second lithium concentrate and a solids removal stage removing solids from the second lithium concentrate or a derivative thereof to yield a second filtered lithium concentrate. The second filtered lithium concentrate or a stream derived thereof may be routed to conversion stage.

At least a portion of the low TDS stream is recycled into the extraction stage.

Extracting lithium from the extraction feed includes contacting the extraction feed with a lithium selective medium to load the medium with lithium and contacting an eluent stream with the lithium-loaded medium to form the lithium intermediate. low TDS stream may then be recycled into the eluent stream. Alternatively or additionally, the brine source stream yields a lithium depleted brine stream after having contacting the lithium selective medium, and using at least a membrane separation operation or thermal vaporizer to yield a reject stream and a fresh water stream, wherein the fresh water stream is recycled, ie directed to any operation of the method, especially having a fresh water need. The reject stream may be returned to the environment, ie reinjected in the geological formation.

The extraction stage may include a continuous counter-current adsorption desorption process.

In an embodiment, the extraction stage comprises a lithium selective electrochemical separation process.

The plurality of reactors may include 2 to 10, preferable 3 to 6, reactors. The lithium concentration range between the lithium concentrate and non-permeating stream may be between 2 and 20. The lithium concentration range between the lithium concentrate and dilute brine stream may be between 2 and 20. The TDS of the lithium concentration is over 120,000 mg/l and preferably over 200,000 mg/l. The lithium concentration of the lithium concentrate may be over 2.0%, preferably over 3.3% weight.

At least a portion of the low TDS stream is recycled as a permeate target feed into another stream used in any stage of the method. The permeate target feed may for instance be one of the aqueous lithium source, extraction feed, lithium intermediate, impurity stage feed or purified lithium stream.

At least a portion of the dilute brine stream is recycled into a dilute brine target feed, and the dilute brine target feed is one of the aqueous lithium source, extraction feed, lithium intermediate, impurity stage feed or purified lithium stream.

In an embodiment, the at least one portion of the low TDS stream recycled into the permeate target feed and/or the at least one portion of the dilute brine stream recycled into the dilute brine target feed is adjusted to manage the concentration of lithium or to manage a ratio of lithium ions to impurity ions into the permeate, respectively dilute brine, target feed.

In an embodiment, the aqueous lithium source has a lithium concentration less than about 100 ppm, optionally less than 70 ppm, optionally less than 1 ppm.

In an embodiment, the aqueous lithium source has a total dissolved solids at least 1,000, optionally 10,000 times higher than the lithium concentration of said aqueous source.

The disclosure also relates to a method of recovering lithium from a lithium source, comprising extracting lithium from an extraction feed using direct lithium extraction in an extraction stage to yield a lithium intermediate; performing one or more concentration operations, each concentration operation concentrating an input stream to yield an output feed, wherein the input stream is obtained from the lithium intermediate and/or the extraction feed is obtained from the output feed. The at least one concentration operations includes concentrating a non-permeating stream derived from the input stream to form the output feed using at least a membrane separation operation. The membrane separation operation include flowing the non-permeating stream in a plurality of reactors in series, wherein each reactor contains a semi-permeable membrane separating the reactor into a first and a second volumes, wherein the non-permeating stream flows into the first volume of the plurality of reactors. It also includes collecting the non-permeating stream at the outlet of the plurality of the reactors. A first portion of the non-permeating stream forms the output feed and a second portion of the non-permeating stream is recycled into the membrane separation operation as a permeating stream. It further includes flowing the permeating stream into a second volume of the plurality of reactors counter-current to the non-permeating stream.

In an embodiment, the membrane separation operation is a first membrane separation operation, and the at least one concentration operation includes a second membrane separation operation to concentrate the inlet stream upstream from the first membrane separation operation. The second membrane separation operation includes separating the inlet stream into a preconcentrated stream and a permeate stream using at least a semi-permeable membrane. The preconcentrated stream is the non-permeating stream of the first membrane separation operation.

The method may also include collecting the permeating stream at the outlet of the plurality of the reactors. The collected permeating stream forms a dilute brine stream.

The at least one concentration operation may also include pressurizing the non-permeating stream, especially before flowing it into the first volume of the plurality of reactors, preferably at a target pressure lower than membrane threshold pressure, in particular below 2000 psi, and depressurizing the permeating stream before flowing it into the second volume of the plurality of reactors.

The at least one concentration operation may also include a feed preparation operation that concentrates the aqueous lithium source to yield the extraction feed.

In an embodiment, the method includes performing a purification process on the aqueous lithium source or the extraction feed or a derivative thereof. The method may further comprise performing a purification process on the aqueous lithium source or the extraction feed to form a purified extraction feed, wherein extracting lithium from the extraction feed, or a derivative thereof, comprises extracting lithium from the purified extraction feed.

In an embodiment, the method comprises concentrating the aqueous source to yield a preconcentrated extraction feed in a first concentration process, such as a reverse osmosis process, performing the purification process on the preconcentrated extraction feed to yield a purified preconcentrated extraction feed, and concentrating the purified preconcentrated extraction feed using a second concentration process, such as a counter-flow reverse osmosis process, to yield the extraction feed. In this embodiment, the first and second concentration process may be any of the process described hereinabove, such as any membrane separation operation or evaporation operation. The purification process may be any combination of impurity precipitation, solids removal and divalent impurity selective removal.

The at least one concentration operation may include concentrating a stream derived from the lithium intermediate as the input stream to yield a lithium concentrate as the output feed. Such a concentration operation takes place downstream of the extraction stage, directly on the lithium intermediate or on a stream corresponding to the lithium intermediate that has undergone one or more additional operations. In an embodiment, the stream derived from the lithium intermediate is a first stream, and the method further comprises treating a second stream derived from the lithium intermediate in an impurity stage to remove impurities, and forming a purified lithium stream, wherein the first stream is the purified lithium stream. In other word there might be an impurity treatment operation (ie impurity stage) between the extraction stage and the concentration stage.

The impurity stage may include one or more of the following operations: impurity precipitation, solids removal and divalent impurity selective removal. The impurity precipitation may comprise coagulation-flocculation. The divalent impurity selective removal may comprise an selective electrochemical separation process, that may include an impurity selective membrane, and/or a divalent impurity capture using ion exchange resin. In an embodiment, the impurity stage includes routing the stream derived from the lithium intermediate (ie lithium intermediate or a derivative thereof) in an impurity precipitation operation via coagulation-flocculation to yield a precipitate stream, routing the precipitate stream or a derivative thereof to solids removal to yield a filtered precipitate stream and a precipitate and routing the filtered precipitate stream or a derivative thereof to the divalent impurity selective removal to yield the purified stream. In another embodiment, the impurity stage includes solids removal only to remove impurities precipitated in the impurity preparation stage (detailed below). Other embodiments including one or more instance of one or more of the impurity precipitation, solids removal and divalent impurity selective removal in either order are also part of the current disclosure.

In such embodiment where there is an impurity stage, the one or more concentration operations may further include an impurity preparation stage. In such stage, the input stream is the lithium intermediate and the output feed is an an impurity stage feed, and the second stream (ie undergoing the impurity stage) is the impurity stage feed. In an embodiment, concentrating the lithium intermediate in the impurity preparation stage comprises increasing concentration of one or more impurities in the lithium intermediate to at least 90% of the solubility limit of the one or more impurities in the lithium intermediate. The impurity preparation stage may include a membrane separation operation, or evaporator. Any membrane separation (including counter-flow reverse osmosis, reverse osmosis or a combination thereof) may be used. Enhance or mechanical evaporators may be used as well. The impurity preparation stage is preferably configured so that the impurity stage feed has a TDS (total dissolved solids) over 120,000 mg/l preferably over 200,000 mg/l.

The method may further comprise converting lithium in the lithium concentrate to a lithium product. In particular, the lithium chloride in the lithium concentrate is converted to lithium carbonate and/or hydroxide. In an embodiment, the method includes routing the lithium concentrate or a derivative thereof to a solids removal stage, wherein the solids removal stage removes solids from the lithium concentrate to yield a filtered lithium concentrate and routing the filtered lithium concentrate or a derivative thereof to conversion. In an embodiment, the method includes a first post-extraction concentration stage yielding a first lithium concentrate, a first solids removal stage removing solids from the first lithium concentrate or a derivative thereof to yield a first filtered lithium concentrate, a second post-extraction concentration stage concentrating the first filtered lithium concentrate or a derivative thereof to yield a second lithium concentrate and a solids removal stage removing solids from the second lithium concentrate or a derivative thereof to yield a second filtered lithium concentrate. The second filtered lithium concentrate or a stream derived thereof may be routed to conversion stage.

At least a portion of the low TDS stream is recycled into a permeate target feed, and the permeate target feed may be used in any stage of the method, and may for instance correspond to one of the aqueous lithium source, extraction feed, lithium intermediate, impurity stage feed or purified lithium stream.

At least a portion of the dilute brine stream is recycled into a dilute brine target feed, and the dilute brine target feed is one of the aqueous lithium source, extraction feed, lithium intermediate, impurity stage feed or purified lithium stream.

In an embodiment, the at least one portion of the low TDS stream recycled into the permeate target feed and/or the at least one portion of the dilute brine stream recycled into the dilute brine target feed is adjusted to manage the concentration of lithium or to manage a ratio of lithium ions to impurity ions into the permeate, respectively dilute brine, target feed.

At least a portion of the low TDS stream is recycled, preferably into the extraction stage.

Extracting lithium from the extraction feed includes contacting the extraction feed with a lithium selective medium to load the medium with lithium and contacting an eluent stream with the lithium-loaded medium to form the lithium intermediate. low TDS stream may then be recycled into the eluent stream. Alternatively or additionally, the brine source stream yields a lithium depleted brine stream after having contacting the lithium selective medium, and using at least a membrane separation operation or thermal vaporizer to yield a reject stream and a fresh water stream, wherein the fresh water stream is recycled, ie directed to any operation of the method, especially having a fresh water need. The reject stream may be returned to the environment, ie reinjected in the geological formation.

The extraction stage may include a continuous counter-current adsorption desorption process.

In an embodiment, the extraction stage comprises a lithium selective electrochemical separation process.

The plurality of reactors may include 2 to 10, preferable 3 to 6, reactors. The lithium concentration range between the lithium concentrate and non-permeating stream may be between 2 and 20. The lithium concentration range between the lithium concentrate and dilute brine stream may be between 2 and 20. The TDS of the lithium concentration is over 120,000 mg/l and preferably over 200,000 mg/l. The lithium concentration of the lithium concentrate may be over 2.0%, preferably over 3.3% weight.

In an embodiment, the aqueous lithium source has a lithium concentration less than about 100 ppm, optionally less than 70 ppm, optionally less than 1 ppm.

In an embodiment, the aqueous lithium source has a total dissolved solids at least 1,000, optionally 10,000 times higher than the lithium concentration of said aqueous source.

The disclosure also relates to a method of recovering lithium from a lithium source. The method comprises extracting lithium from an extraction feed using direct lithium extraction in an extraction stage to yield a lithium intermediate; and performing one or more concentration operations, each concentration operation concentrating an input stream to yield an output feed, wherein the input stream is obtained from the lithium intermediate and/or the extraction feed is obtained from the output feed. The at least one concentration operations includes a first membrane separation operation, having a first semi-permeable membrane, yielding from the input stream a preconcentrated stream and a permeate stream, and a second membrane separation operation. The preconcentrated stream flows into a plurality of reactors in series, each containing a semi-permeable membrane separating the reactor into a first volume and a second volume, and the preconcentrated stream flows sequentially as a non-permeating stream into the first volume of each reactor. The non-permeating stream exiting the plurality of reactors yields the output stream. The second membrane operation yields a dilute brine stream that exits the second volume of at least one of the reactors, wherein the dilute brine stream is recycled into the first membrane separation operation.

The second membrane separation operation may include a permeating stream that flows sequentially into the second volume of the plurality of reactors, counter-current to the permeating stream, wherein at least a portion of the non-permeating stream is recycled into the permeating stream, wherein the permeating stream yields the dilute brine stream.

The at least one concentration operations may also include pressurizing the non-permeating stream, especially before flowing it into the first volume of the plurality of reactors, preferably at a target pressure lower than membrane threshold pressure, in particular below 2000 psi, and depressurizing the permeating stream before flowing it into the second volume of the plurality of reactors.

The at least one concentration operation may also include a feed preparation operation that concentrates the aqueous lithium source to yield the extraction feed.

In an embodiment, the method includes performing a purification process on the aqueous lithium source or the extraction feed or a derivative thereof. The method may further comprise performing a purification process on the aqueous lithium source or the extraction feed to form a purified extraction feed, wherein extracting lithium from the extraction feed, or a derivative thereof, comprises extracting lithium from the purified extraction feed.

In an embodiment, the method comprises concentrating the aqueous source to yield a preconcentrated extraction feed in a first concentration process, such as a reverse osmosis process, performing the purification process on the preconcentrated extraction feed to yield a purified preconcentrated extraction feed, and concentrating the purified preconcentrated extraction feed using a second concentration process, such as a counter-flow reverse osmosis process, to yield the extraction feed. In this embodiment, the first and second concentration process may be any of the process described hereinabove, such as any membrane separation operation or evaporation operation. The purification process may be any combination of impurity precipitation, solids removal and divalent impurity selective removal.

The at least one concentration operation may include concentrating a stream derived from the lithium intermediate as the input stream to yield a lithium concentrate as the output feed. Such a concentration operation takes place downstream of the extraction stage, directly on the lithium intermediate or on a stream corresponding to the lithium intermediate that has undergone one or more additional operations. In an embodiment, the stream derived from the lithium intermediate is a first stream, and the method further comprises treating a second stream derived from the lithium intermediate in an impurity stage to remove impurities, and forming a purified lithium stream, wherein the first stream is the purified lithium stream. In other word there might be an impurity treatment operation (ie impurity stage) between the extraction stage and the concentration stage.

The impurity stage may include one or more of the following operations: impurity precipitation, solids removal and divalent impurity selective removal. The impurity precipitation may comprise coagulation-flocculation. The divalent impurity selective removal may comprise an selective electrochemical separation process, that may include an impurity selective membrane, and/or a divalent impurity capture using ion exchange resin. In an embodiment, the impurity stage includes routing the stream derived from the lithium intermediate (ie lithium intermediate or a derivative thereof) in an impurity precipitation operation via coagulation-flocculation to yield a precipitate stream, routing the precipitate stream or a derivative thereof to solids removal to yield a filtered precipitate stream and a precipitate and routing the filtered precipitate stream or a derivative thereof to the divalent impurity selective removal to yield the purified stream. In another embodiment, the impurity stage includes solids removal only to remove impurities precipitated in the impurity preparation stage (detailed below). Other embodiments including one or more instance of one or more of the impurity precipitation, solids removal and divalent impurity selective removal in either order are also part of the current disclosure.

In such embodiment where there is an impurity stage, the one or more concentration operations may further include an impurity preparation stage. In such stage, the input stream is the lithium intermediate and the output feed is an an impurity stage feed, and the second stream (ie undergoing the impurity stage) is the impurity stage feed. In an embodiment, concentrating the lithium intermediate in the impurity preparation stage comprises increasing concentration of one or more impurities in the lithium intermediate to at least 90% of the solubility limit of the one or more impurities in the lithium intermediate At least a portion of the permeate stream may be recycled into is a permeate target feed. The permeate target feed may be any stream used in one or more stages of the method, for instance one of the aqueous lithium source, extraction feed, lithium intermediate, impurity stage feed or purified lithium stream.

At least a portion of the permeate stream may be recycled into the extraction stage.

Extracting lithium from the extraction feed includes contacting the extraction feed with a lithium selective medium to load the medium with lithium and contacting an eluent stream with the lithium-loaded medium to form the lithium intermediate. low TDS stream may then be recycled into the eluent stream. Alternatively or additionally, the brine source stream yields a lithium depleted brine stream after having contacting the lithium selective medium, and using at least a membrane separation operation or thermal vaporizer to yield a reject stream and a fresh water stream, wherein the fresh water stream is recycled, ie directed to any operation of the method, especially having a fresh water need. The reject stream may be returned to the environment, ie reinjected in the geological formation.

The extraction stage may include a continuous counter-current adsorption desorption process.

In an embodiment, the extraction stage comprises a lithium selective electrochemical separation process.

The plurality of reactors may include 2 to 10, preferable 3 to 6, reactors. The lithium concentration range between the lithium concentrate and non-permeating stream may be between 2 and 20. The lithium concentration range between the lithium concentrate and dilute brine stream may be between 2 and 20. The TDS of the lithium concentration is over 120,000 mg/l and preferably over 200,000 mg/l. The lithium concentration of the lithium concentrate may be over 2.0%, preferably over 3.3% weight.

In an embodiment, the aqueous lithium source has a lithium concentration less than about 100 ppm, optionally less than 70 ppm, optionally less than 1 ppm.

In an embodiment, the aqueous lithium source has a total dissolved solids at least 1,000, optionally 10,000 times higher than the lithium concentration of said aqueous source.

The disclosure also relates to a method of recovering lithium from a brine source. The method comprises extracting lithium from an extraction feed using direct lithium extraction in an extraction stage to yield a lithium intermediate; and performing one or more concentration operations, each concentration operation concentrating an input stream to yield an output feed, wherein the input stream is obtained from the lithium intermediate and/or the extraction feed is obtained from the output feed. The at least one concentration operations may include a first membrane separation operation, having a first semi-permeable membrane, yielding from the input stream a preconcentrated stream and a permeate stream, and concentrating the preconcentrated stream using a second membrane separation operation, wherein the second membrane operation includes a plurality of reactors in series each having a semi-permeable membrane to yield the output stream, wherein the second membrane separation operation is configured so that the lithium concentrate has a TDS over 120,000 mg/l, preferably over 200,000 mg/l.

In an embodiment, in the second membrane operation, each semi-permeable membrane separate the associated reactor into a first volume and a second volume, wherein the preconcentrated stream flows sequentially as a non-permeating stream into the first volume of each reactor, and wherein the second membrane operation yields a dilute brine stream that exits the second volume of at least one of the reactors, wherein the dilute brine stream is recycled into the first membrane separation operation.

The second membrane separation operation may include a permeating stream that flows sequentially into the second volume of the plurality of reactors, counter-current to the permeating stream, wherein at least a portion of the non-permeating stream is recycled into the permeating stream, wherein the permeating stream yields the dilute brine stream.

The at least one concentration operations may also include pressurizing the non-permeating stream, especially before flowing it into the first volume of the plurality of reactors, preferably at a target pressure lower than membrane threshold pressure, in particular below 2000 psi, and depressurizing the permeating stream before flowing it into the second volume of the plurality of reactors.

The at least one concentration operation may also include a feed preparation operation that concentrates the aqueous lithium source to yield the extraction feed.

In an embodiment, the method includes feed performing a purification process on the aqueous lithium source or the extraction feed or a derivative thereof. The method may further comprise performing a purification process on the aqueous lithium source or the extraction feed to form a purified extraction feed, wherein extracting lithium from the extraction feed, or a derivative thereof, comprises extracting lithium from the purified extraction feed.

In an embodiment, the method comprises concentrating the aqueous source to yield a preconcentrated extraction feed in a first concentration process, such as a reverse osmosis process, performing the purification process on the preconcentrated extraction feed to yield a purified preconcentrated extraction feed, and concentrating the purified preconcentrated extraction feed using a second concentration process, such as a counter-flow reverse osmosis process, to yield the extraction feed. In this embodiment, the first and second concentration process may be any of the process described hereinabove, such as any membrane separation operation or evaporation operation. The purification process may be any combination of impurity precipitation, solids removal and divalent impurity selective removal.

The at least one concentration operation may include concentrating a stream derived from the lithium intermediate as the input stream to yield a lithium concentrate as the output feed. Such a concentration operation takes place downstream of the extraction stage, directly on the lithium intermediate or on a stream corresponding to the lithium intermediate that has undergone one or more additional operations. In an embodiment, the stream derived from the lithium intermediate is a first stream, and the method further comprises treating a second stream derived from the lithium intermediate in an impurity stage to remove impurities, and forming a purified lithium stream, wherein the first stream is the purified lithium stream. In other word there might be an impurity treatment operation (ie impurity stage) between the extraction stage and the concentration stage.

The impurity stage may include one or more of the following operations: impurity precipitation, solids removal and divalent impurity selective removal. The impurity precipitation may comprise coagulation-flocculation. The divalent impurity selective removal may comprise an selective electrochemical separation process, that may include an impurity selective membrane, and/or a divalent impurity capture using ion exchange resin. In an embodiment, the impurity stage includes routing the stream derived from the lithium intermediate (ie lithium intermediate or a derivative thereof) in an impurity precipitation operation via coagulation-flocculation to yield a precipitate stream, routing the precipitate stream or a derivative thereof to solids removal to yield a filtered precipitate stream and a precipitate and routing the filtered precipitate stream or a derivative thereof to the divalent impurity selective removal to yield the purified stream. In another embodiment, the impurity stage includes solids removal only to remove impurities precipitated in the impurity preparation stage (detailed below). Other embodiments including one or more instance of one or more of the impurity precipitation, solids removal and divalent impurity selective removal in either order are also part of the current disclosure.

In such embodiment where there is an impurity stage, the one or more concentration operations may further include an impurity preparation stage. In such stage, the input stream is the lithium intermediate and the output feed is an an impurity stage feed, and the second stream (ie undergoing the impurity stage) is the impurity stage feed. In an embodiment, concentrating the lithium intermediate in the impurity preparation stage comprises increasing concentration of one or more impurities in the lithium intermediate to at least 90% of the solubility limit of the one or more impurities in the lithium intermediate At least a portion of the permeate stream may be recycled into is a permeate target feed. The permeate target feed may be used in any stage of the method and for instance may be one of the aqueous lithium source, extraction feed, lithium intermediate, impurity stage feed or purified lithium stream.

At least a portion of the permeate stream may be recycled into the extraction stage.

Extracting lithium from the extraction feed includes contacting the extraction feed with a lithium selective medium to load the medium with lithium and contacting an eluent stream with the lithium-loaded medium to form the lithium intermediate. low TDS stream may then be recycled into the eluent stream. Alternatively or additionally, the brine source stream yields a lithium depleted brine stream after having contacting the lithium selective medium, and using at least a membrane separation operation or thermal vaporizer to yield a reject stream and a fresh water stream, wherein the fresh water stream is recycled, ie directed to any operation of the method, especially having a fresh water need. The reject stream may be returned to the environment, ie reinjected in the geological formation.

The extraction stage may include a continuous counter-current adsorption desorption process.

In an embodiment, the extraction stage comprises a lithium selective electrochemical separation process.

The plurality of reactors may include 2 to 10, preferable 3 to 6, reactors. The lithium concentration range between the lithium concentrate and non-permeating stream may be between 2 and 20. The lithium concentration range between the lithium concentrate and dilute brine stream may be between 2 and 20. The TDS of the lithium concentration is over 120,000 mg/l and preferably over 200,000 mg/l. The lithium concentration of the lithium concentrate may be over 2.0%, preferably over 3.3% weight.

In an embodiment, the aqueous lithium source has a lithium concentration less than about 100 ppm, optionally less than 70 ppm, optionally less than 1 ppm.

In an embodiment, the aqueous lithium source has a total dissolved solids at least 1,000, optionally 10,000 times higher than the lithium concentration of said aqueous source.

The disclosure also relates to a method of recovering lithium from a brine source, comprising extracting lithium from an extraction feed using direct lithium extraction in an extraction stage to yield a lithium intermediate. The method also includes performing one or more concentration operations, each concentration operation concentrating an input stream to yield an output feed, wherein the input stream is obtained from the lithium intermediate and/or the extraction feed is obtained from the output feed. The at least one concentration operations includes at least a membrane separation operation, wherein at least one the membrane separation operation includes a plurality of reactors in series each having a semi-permeable membrane, yields a lithium concentrate and a dilute brine stream, and is configured so that the lithium concentrate has a TDS over 120,000 mg/l, preferably over 200,000 mg/l. The method also includes separating the dilute brine stream using a semi-permeable membrane into two streams including a permeate stream, wherein the permeate stream has a TDS under 2,000 mg/l, preferably under 500 mg/l, and recycling the permeate stream, ie directing it to any operation of the method, especially having a fresh water need.

In an embodiment, the one or more concentration operations include a first membrane separation operation yielding a preconcentrated stream and a diluted stream from the input stream, a second membrane operation, wherein the at least one membrane separation is the second membrane operation. The method also includes providing the dilute brine stream into the first membrane separation operation, wherein the diluted stream is the permeate stream.

In an embodiment, in the second membrane separation operation, each semi-permeable membrane separate the associated reactor into a first volume and a second volume, wherein a stream derived from the input stream flows sequentially as a non-permeating stream into the first volume of each reactor, and wherein the dilute brine stream that exits the second volume of at least one of the reactors, wherein the dilute brine stream is recycled into the first membrane separation operation. The second membrane separation operation may also have a permeating stream that flows sequentially into the second volume of the plurality of reactors, counter-current to the permeating stream, wherein at least a portion of the non-permeating stream is recycled into the permeating stream, wherein the permeating stream yields the dilute brine stream.

The at least one concentration operation may include a feed preparation operation that concentrates the aqueous lithium source to yield the extraction feed.

The at least one concentration operation may include concentrating a stream derived from the lithium intermediate to yield a lithium concentrate. Such a concentration operation takes place downstream of the extraction stage, directly on the lithium intermediate or on a stream corresponding to the lithium intermediate that has undergone one or more additional operations. In an embodiment, the stream derived from the lithium intermediate is a first stream, and the method further comprises treating a second stream derived from the lithium intermediate in an impurity stage to remove impurities, and forming a purified lithium stream, wherein the first stream is the purified lithium stream. In other word there might be an impurity treatment operation (ie impurity stage) between the extraction stage and the concentration stage.

The impurity stage may include one or more of the following operations : impurity precipitation, solids removal and divalent impurity selective removal. The impurity precipitation may comprise coagulation-flocculation. The divalent impurity selective removal may comprise an selective electrochemical separation process, that may include an impurity selective membrane, and/or a divalent impurity capture using ion exchange resin. In an embodiment, the impurity stage includes routing the stream derived from the lithium intermediate (ie lithium intermediate or a derivative thereof) in an impurity precipitation operation via coagulation-flocculation to yield a precipitate stream, routing the precipitate stream or a derivative thereof to solids removal to yield a filtered precipitate stream and a precipitate and routing the filtered precipitate stream or a derivative thereof to the divalent impurity selective removal to yield the purified stream. In another embodiment, the impurity stage includes solids removal only to remove impurities precipitated in the impurity preparation stage (detailed below). Other embodiments including one or more instance of one or more of the impurity precipitation, solids removal and divalent impurity selective removal in either order are also part of the current disclosure.

In such embodiment where there is an impurity stage, the one or more concentration operations may further include an impurity preparation stage. In such stage, the input stream is the lithium intermediate and the output feed is an an impurity stage feed, and the second stream (ie undergoing the impurity stage) is the impurity stage feed. In an embodiment, concentrating the lithium intermediate in the impurity preparation stage comprises increasing concentration of one or more impurities in the lithium intermediate to at least 90% of the solubility limit of the one or more impurities in the lithium intermediate At least a portion of the permeate stream may recycled into the extraction stage.

In an embodiment, extracting lithium from the extraction feed includes contacting the extraction feed stream with a lithium selective medium to load the medium with lithium and contacting an eluent stream with the lithium-loaded medium to form the lithium intermediate. The permeate stream may be recycled into the eluent stream. Additionally or alternatively, the brine source stream yields a lithium depleted brine stream after having contacting the lithium selective medium, and using at least a membrane separation operation or thermal vaporizer to yield a reject stream and a fresh water stream, wherein the fresh water stream is recycled, ie directed to any operation of the method, especially having a fresh water need.

The extraction stage may include a continuous counter-current adsorption desorption process.

The plurality of reactors may include 2 to 10, preferable 3 to 6, reactors. The lithium concentration range between the lithium concentrate and non-permeating stream may be between 2 and 20. The lithium concentration range between the lithium concentrate and dilute brine stream may be between 2 and 20. The lithium concentration of the lithium concentrate may be over 2.0%, preferably over 3.3% weight.

The method may also include pressurizing the input stream, especially before the at least one membrane separation operation, preferably at a target pressure lower than membrane threshold pressure, in particular below 2000 psi.

In the above, when reading "a first stream derived from a second stream", "a first stream obtained from a second stream" or 'a first stream derivative of a second stream' shall be interpreted either as the first stream being the second stream or resulting from one or more operations performed on the second stream to change its properties such as its composition.

While the foregoing is directed to embodiments of the present invention, other and further embodiments of the present disclosure may be devised without departing from the basic scope thereof, and the scope thereof is determined by the claims that follow.

We claim:

1. A method of recovering lithium from a brine source, comprising:
    extracting lithium from an extraction feed using direct lithium extraction in an extraction stage to yield a lithium intermediate;
    performing one or more concentration operations, each concentration operation concentrating an input stream obtained from the lithium intermediate, wherein the one or more concentration operations include at least a membrane separation operation having a plurality of reactors in series each having a semi-permeable membrane, to yield a lithium concentrate and a dilute brine stream from the input stream, and is configured so that the lithium concentrate has a TDS over 120,000 mg/L;
    separating the dilute brine stream using a semi-permeable membrane into two streams including a permeate stream, wherein the permeate stream has a TDS under 2,000 mg/L; and
    recycling the permeate stream.

2. The method of claim 1,
    wherein the one or more concentration operations include:
        a first membrane separation operation yielding a pre-concentrated stream and a diluted stream from the input stream,
        a second membrane operation, wherein the at least one membrane separation is the second membrane operation,
    and the method includes providing the dilute brine stream into the first membrane separation operation, wherein the diluted stream is the permeate stream.

3. The method of claim 1, wherein, in the second membrane separation operation, each semi-permeable membrane separate the associated reactor into a first volume and a second volume, wherein a stream derived from the input stream flows sequentially as a first stream into the first volume of each reactor, and wherein the dilute brine stream that exits the second volume of at least one of the reactors, wherein the dilute brine stream is recycled into the first membrane separation operation.

4. The method of claim 3, wherein the second membrane separation operation includes a second stream that flows sequentially into the second volume of the plurality of reactors, counter-current to the first stream, wherein at least a portion of the first stream is recycled into the second stream, wherein the second stream yields the dilute brine stream.

5. The method of claim 1, wherein the one or more concentration operations include concentrating a stream derived from the lithium intermediate to yield a lithium concentrate.

6. The method of claim 1, wherein at least a portion of the permeate stream is recycled into the extraction stage.

7. The method of claim 4, wherein the one or more concentration operations include pressurizing the input stream.

8. The method of claim 7, wherein the input stream is pressurized at a target pressure below 2000 psi.

9. The method of claim 1, the stream derived from the lithium intermediate is a first stream, and the method further comprises treating a second stream derived from the lithium intermediate in an impurity stage to remove impurities, and forming a purified lithium stream, wherein the first stream is the purified lithium stream.

10. The method of claim 9, wherein the impurity stage includes one or more of the following operations: impurity precipitation, solids removal, and divalent impurity selective removal.

11. The method of claim 10, wherein the impurity stage includes routing the stream derived from the lithium intermediate in an impurity precipitation operation via coagulation-flocculation to yield a precipitate stream, routing the precipitate stream or a derivative thereof to solids removal to yield a filtered precipitate stream and a precipitate, and routing the filtered precipitate stream or a derivative thereof to the divalent impurity selective removal to yield the purified stream.

12. The method of claim 1, wherein extracting lithium from the extraction feed includes contacting the extraction feed with a lithium selective medium to load the medium with lithium and contacting an eluent stream with the lithium-loaded medium to form the lithium intermediate.

13. The method of claim 12, wherein the permeate stream is recycled into the eluent stream.

14. The method of claim 12, wherein the extraction feed after having contacted the lithium selective medium yields a lithium depleted brine stream, wherein the method includes using at least a membrane separation operation or thermal vaporizer to yield a reject stream and a fresh water stream from the lithium depleted brine stream.

15. The method of claim 14, wherein the fresh water stream is recycled.

16. The method of claim 1, wherein the extraction stage includes a continuous counter-current adsorption desorption process.

17. The method of claim 1, wherein the extraction stage comprises a lithium selective electrochemical separation process.

18. The method of claim 1, wherein the lithium concentrate has a TDS over 200,000 mg/L.

19. The method of claim 1, wherein the permeate stream has a TDS below 500 mg/L.

20. The method of claim 1, further comprising a feed preparation operation that concentrates an aqueous lithium source to yield the extraction feed.

* * * * *